US011794662B2

(12) United States Patent
Robinson et al.

(10) Patent No.: US 11,794,662 B2
(45) Date of Patent: Oct. 24, 2023

(54) CARGO STORAGE SYSTEM AND METHODS FOR USING SAME

(71) Applicants: Mason Robinson, Loomis, CA (US); Ashley Robinson, Loomis, CA (US)

(72) Inventors: Mason Robinson, Loomis, CA (US); Ashley Robinson, Loomis, CA (US); Corey Vaughan, Atlanta, GA (US)

(73) Assignees: Mason Robinson, Loomis, CA (US); Ashley Robinson, Loomis, CA (US)

( * ) Notice: Subject to any disclaimer, the term of this patent is extended or adjusted under 35 U.S.C. 154(b) by 0 days.

(21) Appl. No.: 17/512,605

(22) Filed: Oct. 27, 2021

(65) Prior Publication Data

US 2022/0126759 A1  Apr. 28, 2022

Related U.S. Application Data

(60) Provisional application No. 63/105,936, filed on Oct. 27, 2020.

(51) Int. Cl.
*B60R 9/12* (2006.01)
*B60R 9/06* (2006.01)

(52) U.S. Cl.
CPC . *B60R 9/12* (2013.01); *B60R 9/06* (2013.01)

(58) Field of Classification Search
CPC .................................... B60R 9/06; B60R 9/12
USPC ........................................................ 224/321
See application file for complete search history.

(56) References Cited

U.S. PATENT DOCUMENTS

| | | | | |
|---|---|---|---|---|
| 4,469,257 A | * | 9/1984 | Parker | B60R 9/12 224/570 |
| 4,582,015 A | * | 4/1986 | Hunter | B63B 32/83 224/406 |
| 5,390,837 A | * | 2/1995 | Ruffolo, Jr. | B60R 9/06 224/570 |
| 5,599,053 A | * | 2/1997 | Wilson | B60R 9/00 224/403 |
| 5,906,304 A | * | 5/1999 | Baldacchino | B63B 32/83 224/543 |
| 5,957,353 A | * | 9/1999 | Clement | B60R 5/006 224/543 |
| 6,019,265 A | * | 2/2000 | Deloza | B60R 9/08 224/571 |
| 6,435,586 B2 | | 8/2002 | Getzschman et al. | |

(Continued)

*Primary Examiner* — Peter N Helvey
(74) *Attorney, Agent, or Firm* — BEKIARES ELIEZER LLP

(57) ABSTRACT

Disclosed herein is a modular cargo storage rack and system for a vehicle cargo area, comprising a spanner assembly and at least one at least one carrier module releasably coupled to said spanner assembly and configured to securely store or carry cargo, the carrier module including a plurality of guide posts, each guide post including a channel for receiving a guiding rail; a plurality of guiding rails, at least one guiding rail configured to cooperatively slide back and forth in a channel along a predetermined travel path associated with orientation of said channel; at least one carrier support including a floor roller, each carrier support connected to at least one guiding rail and configured to move back and forth along said predetermined travel path; and a cargo holding apparatus, such as a rack or compartment. Also disclosed herein are methods for using the disclosed cargo storage devices and system.

20 Claims, 22 Drawing Sheets

(56) References Cited

U.S. PATENT DOCUMENTS

| | | | |
|---|---|---|---|
| 6,457,619 B1 * | 10/2002 | Werner | B60R 9/08 |
| | | | 224/497 |
| 6,505,764 B2 | 1/2003 | Vining et al. | |
| 6,685,070 B2 | 2/2004 | Szigeti | |
| 6,758,508 B2 | 7/2004 | Weyhrich | |
| 7,152,769 B2 * | 12/2006 | Johnston | B60R 9/12 |
| | | | 224/325 |
| 9,237,633 B2 | 1/2016 | Oh | |
| 9,327,633 B1 | 5/2016 | Patton et al. | |
| 9,429,269 B2 * | 8/2016 | Wilhelm | B60R 9/12 |
| 9,611,005 B2 * | 4/2017 | Tomassen | B62M 27/00 |
| 11,304,516 B2 * | 4/2022 | McCardle | B60R 9/06 |
| 2006/0186157 A1 * | 8/2006 | Dibble | B60R 9/12 |
| | | | 224/403 |
| 2010/0096872 A1 | 4/2010 | Brogdon | |

\* cited by examiner

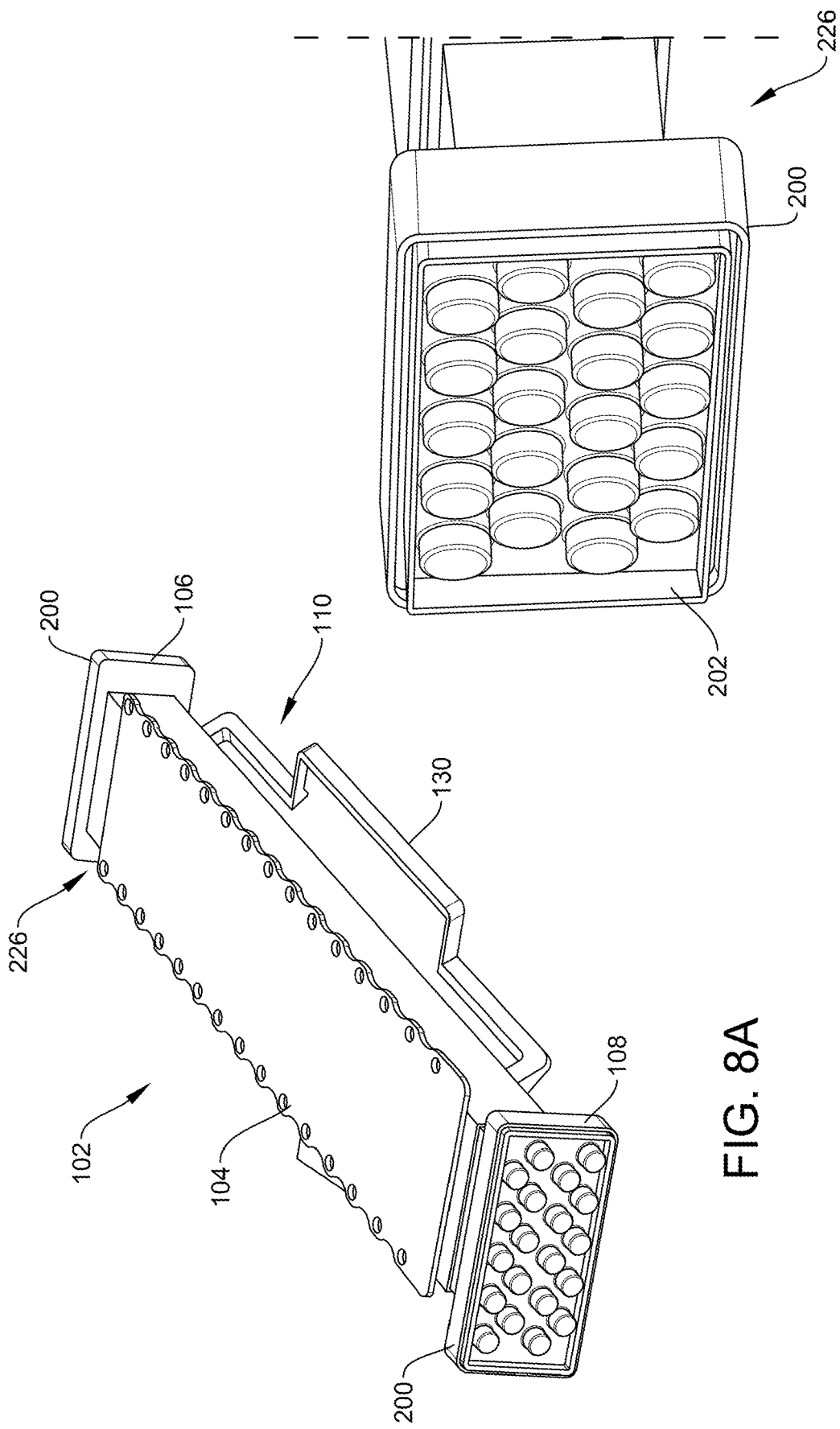

CARGO STORAGE SYSTEM AND METHODS FOR USING SAME

RELATED APPLICATION

Under provisions of 35 U.S.C. § 119(e), the Applicant claims benefit of U.S. Provisional Application No. 62/105, 936 filed on Oct. 27, 2020, and having inventors in common, which is incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF INVENTION

The present invention relates to devices, systems, and methods for providing cargo storage for a vehicle cargo area, such as a truck bed or rear cargo hold.

BACKGROUND OF THE INVENTION

Currently there are limited cargo storage solutions for securing skis and snowboards that are designed for use with a bed of a truck. As such, truck owners are often limited to using a roof rack system or a suspended rack system that goes above the bed of the truck to secure skis/snowboard. Some limitations with using current options can include truck cabs that are not long enough to use with roof rack systems and/or trucks with a bed cover or camper shell that cannot use the suspended rack system over the bed. Furthermore, current systems are not easy to access for many users and are not easily removed from the vehicle. Still further, most systems are designed to support or hold a single type of cargo or accessory (e.g., bicycle or ski, etc.).

Accordingly, there remains a need for an improved cargo storage system for vehicle cargo areas such as truck beds that easily allow an individual to install, deploy, and retrieve for cargo loading/unloading. Such a cargo storage system would preferably be able to fit beds of varying sizes and configurations, slidable to allow for easy access, and be modular to support a variety of cargo and equipment. This need and other needs are satisfied by the various aspects of the present disclosure.

SUMMARY OF THE INVENTION

In accordance with the purposes of the invention, as embodied and broadly described herein, the invention, in one aspect, relates to a modular vehicle cargo storage system, and methods of providing cargo and equipment storage for vehicle cargo areas, such as on a truck bed or flatbed platform. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

In another exemplary aspect, the invention relates to a system for providing cargo storage, the system including a cargo storage system comprising a spanner assembly configured to be removably mounted to the cargo area and at least one carrier module releasably coupled to said spanner assembly and configured to securely store or carry cargo.

In another exemplary aspect, the invention relates to a cargo storage system for a vehicle cargo area, the system comprising: a spanner assembly configured to be removably mounted to the cargo area; at least one carrier module configured to releasably couple to said spanner assembly; and a cargo holding apparatus configured to detachably connect with the carrier module.

In another exemplary aspect, the invention relates to a cargo storage system for a vehicle cargo area, the system comprising: a spanner assembly configured to be removably mounted to the cargo area, the spanner assembly comprising: an extendible spanner member having first and second opposed ends, said first end configured to be releasably secured to a first sidewall of the cargo area and said second end configured to be releasable secured to an opposed second sidewall of the cargo area; an assembly support connected to the spanner member and configured to be positioned on a floor of a cargo area; and at least one mounting plate connected to at least one portion of the spanner member, the at least one mounting plate configured for removably mounting one or more carrier modules; and a plurality of guide posts configured to releasably connect to said mounting plate, each guide post including a channel for receiving a guiding rail; a plurality of guiding rails, at least one guiding rail configured to cooperatively slide back and forth in a guide post channel along a predetermined travel path associated with orientation of said channel; at least one carrier support including a floor roller, each carrier support connected to at least one guiding rail and configured to move back and forth along said predetermined travel path; and a cargo holding apparatus configured to detachably connect with one or more guiding rails.

In further aspects, the invention relates to a cargo storage system comprising a spanner assembly configured to be removably mounted to the cargo area, the spanner assembly comprising: an extendible spanner member having first and second opposed ends, said first end configured to be releasably secured to a first sidewall of the cargo area and said second end configured to be releasable secured to an opposed second sidewall of the cargo area; an assembly support connected to the spanner member and configured to be positioned on a floor of a cargo area; and at least one mounting plate connected to at least one portion of the spanner member, the at least one mounting plate configured for removably mounting one or more carrier modules; and at least one carrier module releasably coupled to said spanner assembly and configured to securely store or carry cargo, the at least one carrier module comprising a plurality of guide posts, each guide post including a channel for receiving a guiding rail; a plurality of guiding rails, at least one guiding rail configured to cooperatively slide back and forth in a channel along a predetermined travel path associated with orientation of said channel; at least one carrier support including a floor roller, each carrier support connected to at least one guiding rail and configured to move back and forth along said predetermined travel path; and a cargo holding apparatus, such as a rack. In further aspects, the carrier module may comprise at least one guiding mechanism for directing or routing the guiding rails along a travel path. In still further aspects, the cargo holding apparatus may be detachably connected and configured for various cargo and equipment types.

In further aspects, the invention also relates to methods for making and using the disclosed cargo racks, apparatuses, devices and systems, and kits comprising the disclosed apparatuses, devices, and systems.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate several aspects of the invention and together with the description, serve to explain the principles of the invention. The drawings may contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIGS. 8A-8B show depictions of a cargo storage system in an operating environment in accordance with an exemplary embodiment of the present disclosure.

DETAILED DESCRIPTION OF THE INVENTION

Figure 1:
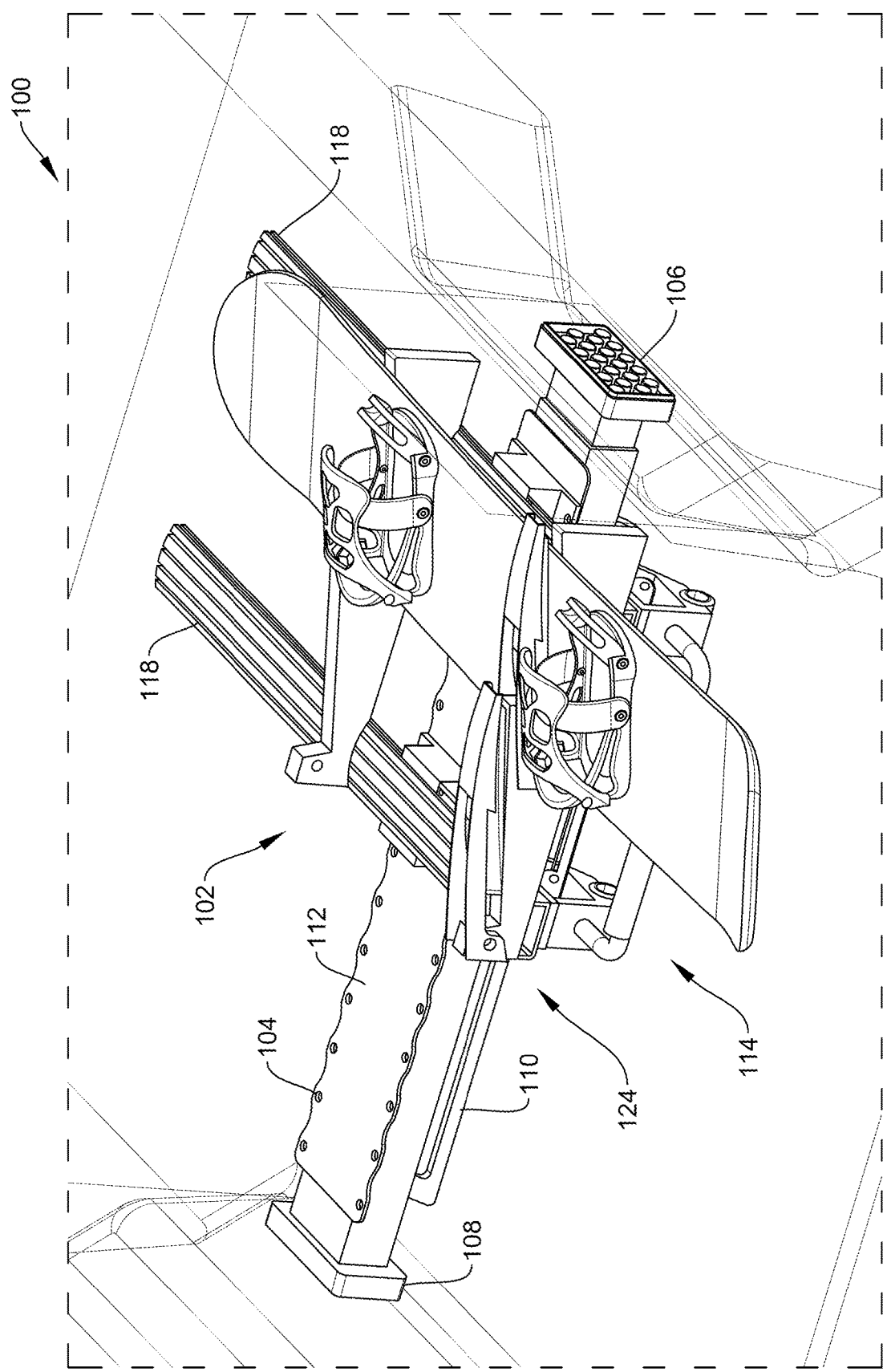
FIG. 1 shows a perspective view of a cargo storage system in an operating environment and storing equipment in accordance with an exemplary embodiment of the present disclosure.

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims, which follow, reference will be made to a number of terms which shall be defined herein.

As used in the specification and the appended claims, the singular forms "a," "an" and "the" include plural referents unless the context clearly dictates otherwise. Thus, for example, reference to "a leg" includes two or more legs.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Disclosed are the materials, components, parts, and/or elements to be used to manufacture the disclosed devices and systems of the invention as well as the materials themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

B. System Overview

As briefly described above, the present disclosure provides, in various aspects, a device and system for providing equipment and cargo storage for vehicles. This overview is provided to introduce a selection of concepts in a simplified form that are further described below. This overview is not intended to identify key features or essential features of the claimed subject matter. Nor is this overview intended to be used to limit the claimed subject matter's scope.

In one aspect, the disclosed cargo storage device and system can provide a convenient system that can be capable of being installed in a vehicle and/or truck bed to provide deployable equipment and cargo storage for easy loading and unloading. The cargo storage device and system can be easily installed and deployed by a single user for loading and unloading equipment.

Some existing systems for truck beds include cargo hardware and racks that can be deployed and retracted; however, these systems require proprietary tracks to be permanently mounted for the deployment and retraction functionality. The disclosed cargo storage device and system is both removable and modular, such that a user need only install the spanner assembly and mount the desired cargo carrier module posts corresponding to the equipment type, size, and/or configuration of the load. For example, the carrier module may be in the form of a rack for carrying skis and snowboards or a container for holding general cargo. The portability and modularity of the system can enable a user to move the system between different vehicles and a number of different cargo configurations and equipment types.

In one aspect, the present disclosure provides a cargo storage system for a vehicle cargo area, the system comprising: a spanner assembly configured to be removably mounted to the cargo area, the spanner assembly comprising: an extendible spanner member having first and second opposed ends, said first end configured to be releasably secured to a first sidewall of the cargo area and said second end configured to be releasable secured to an opposed second sidewall of the cargo area; an assembly support connected to the spanner member and configured to be positioned on a floor of a cargo area; and at least one mounting plate connected to at least one portion of the spanner member, the at least one mounting plate configured for removably mounting one or more carrier modules; and at least one carrier module configured to releasably couple to said spanner assembly and configured to securely store or carry cargo, the at least one carrier module comprising a plurality of guide posts, each guide post including a channel for receiving a guiding rail; a plurality of guiding rails, at least one guiding rail configured to cooperatively slide back and forth in a channel along a predetermined travel path associated with orientation of said channel; at least one carrier support including a floor roller, each carrier support connected to at least one guiding rail and configured to move back and forth along said predetermined travel path; and a cargo holding apparatus configured to detachably connect with the carrier module.

In another aspect, the present disclosure provides a cargo storage system comprising a spanner assembly configured to be removably mounted to the cargo area, the spanner assembly comprising: an extendible spanner member having first and second opposed ends, said first end configured to be releasably secured to a first sidewall of the cargo area and said second end configured to be releasably secured to an opposed second sidewall of the cargo area; an assembly support connected to the spanner member and configured to be positioned on a floor of a cargo area; and at least one mounting plate connected to at least one portion of the spanner member, the at least one mounting plate configured for removably mounting one or more carrier modules; and at least one carrier module releasably coupled to said spanner assembly and configured to securely store or carry cargo, the at least one carrier module comprising a plurality of guide posts, each guide post including a channel for receiving a guiding rail; a plurality of guiding rails, at least one guiding rail configured to cooperatively slide back and forth in a channel along a predetermined travel path associated with orientation of said channel; at least one carrier support including a floor roller, each carrier support connected to at least one guiding rail and configured to move back and forth along said predetermined travel path; and a cargo holding apparatus, such as a rack. In further aspects, the carrier module may comprise at least one guiding mechanism for directing or routing the guiding rails along a travel path. In further aspects, the system may further comprise one or more locking mechanisms, for example, for securing the carrier module to the spanner module and/or for securing cargo or equipment in the cargo holding apparatus.

In another aspect, the present disclosure provides cargo storage system for a vehicle cargo area, the system comprising: a spanner assembly configured to be removably mounted to the cargo area, the spanner assembly comprising: an extendible spanner member having first and second opposed ends, said first end configured to be releasably secured to a first sidewall of the cargo area and said second end configured to be releasable secured to an opposed second sidewall of the cargo area; an assembly support connected to the spanner member and configured to be positioned on a floor of a cargo area; and at least one mounting plate connected to at least one portion of the spanner member, the at least one mounting plate configured for removably mounting one or more carrier modules; and a plurality of guide posts configured to releasably connect to said mounting plate, each guide post including a channel for receiving a guiding rail; a plurality of guiding rails, at least one guiding rail configured to cooperatively slide back and forth in a guide post channel along a predetermined travel path associated with orientation of said channel; at least one carrier support including a floor roller, each carrier support connected to at least one guiding rail and configured to move back and forth along said predetermined travel path; and a cargo holding apparatus configured to detachably connect with one or more guiding rails.

In further aspects, various embodiments of the present invention may further comprise at least one spanner or cross member configured to extend to secure against cargo area sidewalls. In still further aspects, there may be a plurality of cross members configured to connect with cargo area sidewalls. In further aspects, the spanner assembly may include securing mechanism comprising a visual indicator configured to show if one or more predetermined criteria is met. The visual indicator may be configured to show a first color if the predetermined criteria is met, and a second color is the predetermined criteria is not met. The predetermined criteria may be at least one of: a securing force or orientation.

Consistent with various embodiments of the present disclosure, the invention is described as including a spanner assembly with a spanner member having an extendable portion, a length adjustment mechanism or system for adjusting the lengths of the spanner member, and a separate or integrated braking mechanism for securing the extendable portion at a fixed position. In further aspects, the second end of spanner member may have an extendable portion configured to allow selective adjustment of a spanner length to accommodate various cargo area sizes and dimensions, and a spanner member adjustment mechanism, such as a ratcheting mechanism, contained within a portion of spanner assembly or spanner member configured to lengthen or shorten the extendable portion of the spanner member.

In further aspects, the system may comprise at least one braking mechanism in mechanical communication with the extendable portion of the spanner member configured to releasably secure the extendable portion in a locked state at a fixed length. In still further aspects, the system may comprise at least one actuator or handle in operable communication with the spanner member adjustment or braking mechanism configured to selectively release the extendable portion of each leg in an unlocked state to allow selective adjustment of the spanner member length. To this end, each adjustable spanner member may comprise an upper (e.g., main) spanner member and a lower extendable spanner member. The extendable portion of the member may comprise an extendable member having a first diameter adjustably connected to a corresponding portion of the spanner member comprising a spanner member having a second diameter larger than the first diameter. In further aspects, the lower extendable member may be slidably movable into the upper spanner member. In still further aspects, the spanner member may comprise telescoping tubular members, for example, telescoping members that may be arranged to radially extend (i.e., lengthen) and retract (i.e., shorten). Frame and spanner members used to construct the spanner assembly may be in the shape of a three-dimensional polygon, such as a tubular, square or cylinder shape, and the walls may define an interior space or interior sections for containing various operating elements of the invention as described herein. Any other shape (as used herein, the term shape is used in the broad sense of three-dimensional works)

may be employed, so long as the shape is structured so as to be able support the methods of using the invention as more fully disclosed below. In still further aspects, the spanner member ends may comprise a foot that can have a connecting or securing component configured to be releasably secured to a vehicle sidewall. In further aspects.

In further aspects, the system may comprise one or more locking or securing mechanisms configured to releasably secure the spanner assembly, carrier module, carrier support, and/or cargo holding apparatus in a desired state or position.

In various further aspects, the invention includes at least one braking or locking mechanism or other means for releasably securing or locking the carrier module (or any component thereof) and at fixed position. In some aspects, the system and/or carrier module may comprise a plurality of braking mechanisms, each component comprising its own braking mechanism. In still further aspects, the braking mechanism may be in mechanical communication with one or more portions of a portion and configured to selectively secure or lock portion in place.

In further aspects, the braking mechanism may comprise a locked position and an unlocked position. When the braking mechanism is in the locked position, the connected portion be in a locked state at a fixed position and unable to move or be adjusted. When the braking mechanism is in the unlocked position, the movable portion may be in an unlocked state whereby the movable portion is able to extend and/or retract. For example, releasing the braking mechanism, or moving into unlocked position, is configured to allow the user to move the carrier module and/or cargo holding apparatus by allowing travel of the carrier module and/or cargo holding apparatus utilizing the guiding rails and/or carrier supports.

The system may include one or more actuators in operable and/or mechanical communication with braking mechanism to move or otherwise change the braking mechanism from a locked position to an unlocked position. For example, in some aspects, the actuator may be configured to move or pull a compression element or locking arm, which may be connected to the assembly support to secure a movable portion in place, from a locked position to an unlocked position. In other aspects, the actuator may be configured to move or otherwise pull or tilt the movable portion of a spring plunger into an unlocked position from the locked position. In still further aspects, the braking mechanism may comprise cable, straight-bar linkages, or the like. For example, an actuator may be in operable communication with a brake line, carrying a cable therein, mounted to line connection point would pull said cable connected to cable connection points to pull up a locking arm, plunger, compression element, or the like, into the unlocked position to allow the slidable or movable portion to be moved.

In some aspects, the braking mechanism may be a Bowden cable mechanism and the actuator may be a handle, such as "lawnmower" style actuator or a "brake lever" style actuator, or the like. To this end, the system can allow a user's touchpoint to be more accessible and separate from the actual locking/unlocking of the sliding or movable portions (i.e., guide rails and/or carrier support rollers) other non-movable or fixed components. This can result in a more friendly user experience.

In further aspect, the system may incorporate one or more locking mechanisms for theft protection. The locking mechanism may be a "master" lock or individual locking mechanism for each component. For example, the slidable guiding rails may be locked using a barrel lock which may disable the braking mechanism from actuating or unlocking the locking arm, which would prevent movement of the carrier module. In other aspects, the guiding rails may be independently lockable, once they were pushed in, while the braking mechanism can remain unimpeded by default but separately lockable. Furthermore, the system may further prevent tampering by incorporating a "sheath" or shroud, such as guide rail sheaths, which blocks human hands or tools from disabling the installation and stabilizing mechanisms.

In further aspects, the system may comprise a guiding mechanism configured to direct movement of the guiding rails along a fixed travel path. In still further aspects, the guiding mechanism may be configured to prevent rotational movement of the guiding rails. In yet further aspects, the guiding mechanism may comprise a slot (or groove) and pin (or tongue) arrangement, or like mechanism effective to control the travel path and/or rotation of the guiding rails in the channel of the guide posts. In other aspects, the slot or groove may be disposed along a section of the guiding rails and the pin may be disposed in the channel of the guide post. The slot or groove may be configured to receive the pin and direct movement of the pin along the slot in a fixed travel path.

In various aspects, the component characteristics and configuration, such as, for example, size and dimensions, can be configured to adjust for various cargo area dimensions and other factors to achieve optimal operating parameters, load balancing and/or stability. In further aspects, features of the system and components may be configured or utilized to set and/or control the characteristics. For example, at least one of the following may be configured: the type of material used for the carrier modules and components; the member dimensions (e.g., height, width, thickness, etc.); the force transmission characteristics of the spanner member adjustment system; and the extent of exterior surface coverage of surface-contacting portion of the spanner foot or lower end of extendable portion.

While the disclosed embodiments of the spanner member adjustment mechanism utilize ratcheting mechanisms for adjusting or extending the extendable portion, this is not a requirement. In some embodiments, the spanner member adjustment system may utilize, in lieu of or in addition to the ratcheting mechanism, a motorized or other powered means for moving the extendable portion. In still further aspects, the motorized or powered means may comprise a power transmission component such as an electromechanical actuator, motor, belt and pulley, linear actuator, screw drive, rotational motor with linkage, rack and pinion, pneumatic, electromagnetic, hydraulic, and the like. In yet further aspects, the device can comprise a power source configured to provide power one or more device components, such as, a rechargeable or replaceable battery. In even further aspects, the disclosed devices may further comprise one or more of the following components: a voltage regulator, power switch, power management module, battery management module (e.g., fuel gauge), battery charging module, wireless power coil or receiver, wireless power control module, antenna, transceiver, motor controller, interface module, voltage sensor, current sensor, modulation module, and power input.

In further aspects, while carrier modules and/or components of the disclosed system described herein may be permanently mounted in or on a spanner assembly, this is not a requirement. For example, the cargo holding apparatus and/or guiding rails may be configured to be removably attached to the guide posts, e.g., to allow interchange and/or replacement. Such configurations allow users, drivers, or others to select desired properties or levels in a component, e.g., for customization purposes, for personal preferences, to match desired use conditions, a user's physical characteristics, such as height or strength, or to repair or replace defective or damaged components, etc. As detailed herein, the guiding rails may be detachable couple to the guide post using a guiding mechanism that may be configured to retain the guiding rails in the guide post channel, but allow the rails to slide back and for the. The cargo holding apparatus may be configured to be detachable coupled to one or more guiding rails, such as the first or innermost guide rail, at one or more locations using at least one connecting means or component, such as bolts, nuts, clips, clamps, or the like. Furthermore, carrier support may also be configured to be detachable coupled to a guiding rail, such a second or outermost guide rail using a connecting means or component.

In various aspects, the components of the disclosed system and components can be detachably attached. In further aspects, the components can be connected by a connecting means. In still further aspects, the connecting means can comprise a fitting, insert, adhesive, brazing, soldering, welding, spot weld, screw with nut, rivet, threading, friction fit, snap-fit, twist-lock, or interlocking mechanism or a combination thereof. In yet further aspects, the connection can be achieved using a snap, friction fitting, snap ring, O-ring, pressure fitting, clip, clasp, and the like. The snap ring or O-ring can be retained within a groove to accommodate the snap ring or O-ring. In a further aspect, the system can comprise an engagement means for coupling and holding components together. In a further aspect, the engagement means can be a screwing mechanism, a click-lock mechanism, or friction mechanism, or the like. In still further aspects, the system components can be integrally or mechanically attached to other components. In a yet further aspect, the disclosed components can be connected, attached, or mounted using a connecting means, the connecting means comprising a fitting, insert, adhesive, brazing, soldering, welding, spot weld, screw with nut, rivet, fitting, insert, threading, friction fit, or snap-fit or a combination thereof.

C. System Configuration

According to various aspects of the invention, the cargo storage racks, devices and systems of the present disclosure can comprise multiple configurations. FIGS. 1-13 illustrate non-limiting examples of embodiments of operating environments, mechanisms, and components for the disclosed cargo storage racks, devices and systems. Although the operating environments, mechanisms, and components are disclosed with specific functionality, it should be understood that functionality may be shared between mechanisms and/or components, with some functions split between mechanisms and/or components, while other functions duplicated by the mechanisms and/or components. Furthermore, the name of the mechanisms and/or components should not be construed as limiting upon the functionality of the mechanisms and/or components. Moreover, each stage in a method or claim language can be considered independently without the context of the other stages. Each stage may contain language defined in other portions of this specifications. Each stage disclosed for one mechanism and/or component may be mixed with the operational stages of another mechanism and/or component. Each stage can be claimed on its own and/or interchangeably with other stages of other mechanisms and/or components.

FIGS. 1-10B show a first exemplary embodiment of a cargo storage system 100 for providing cargo storage for a truck bed in accordance with the present invention. As shown in FIG. 1, the system 100 includes a spanner assembly 102 configured to be removably mounted to the cargo area. The spanner assembly 102 may include an extendible spanner member 104 having a first end 106 and a second end 108, the second end opposing the first end. In some aspects, the first end 106 may be configured to be releasably secured to a first sidewall of the cargo area and the second end 108 may be configured to be releasably secured to an opposed second sidewall of the cargo area.

In some aspects, the system 100 includes an assembly support 110 connected to the spanner member 104 and configured to be positioned on a floor of a cargo area. The system 100 may also include at least one mounting plate 112 connected to at least one portion of the spanner member 104. In aspects, the at least one mounting plate 112 may be configured for removably mounting one or more carrier modules 114. For example, the carrier module 114 may be releasably coupled to the spanner assembly 102.

Figure 2:
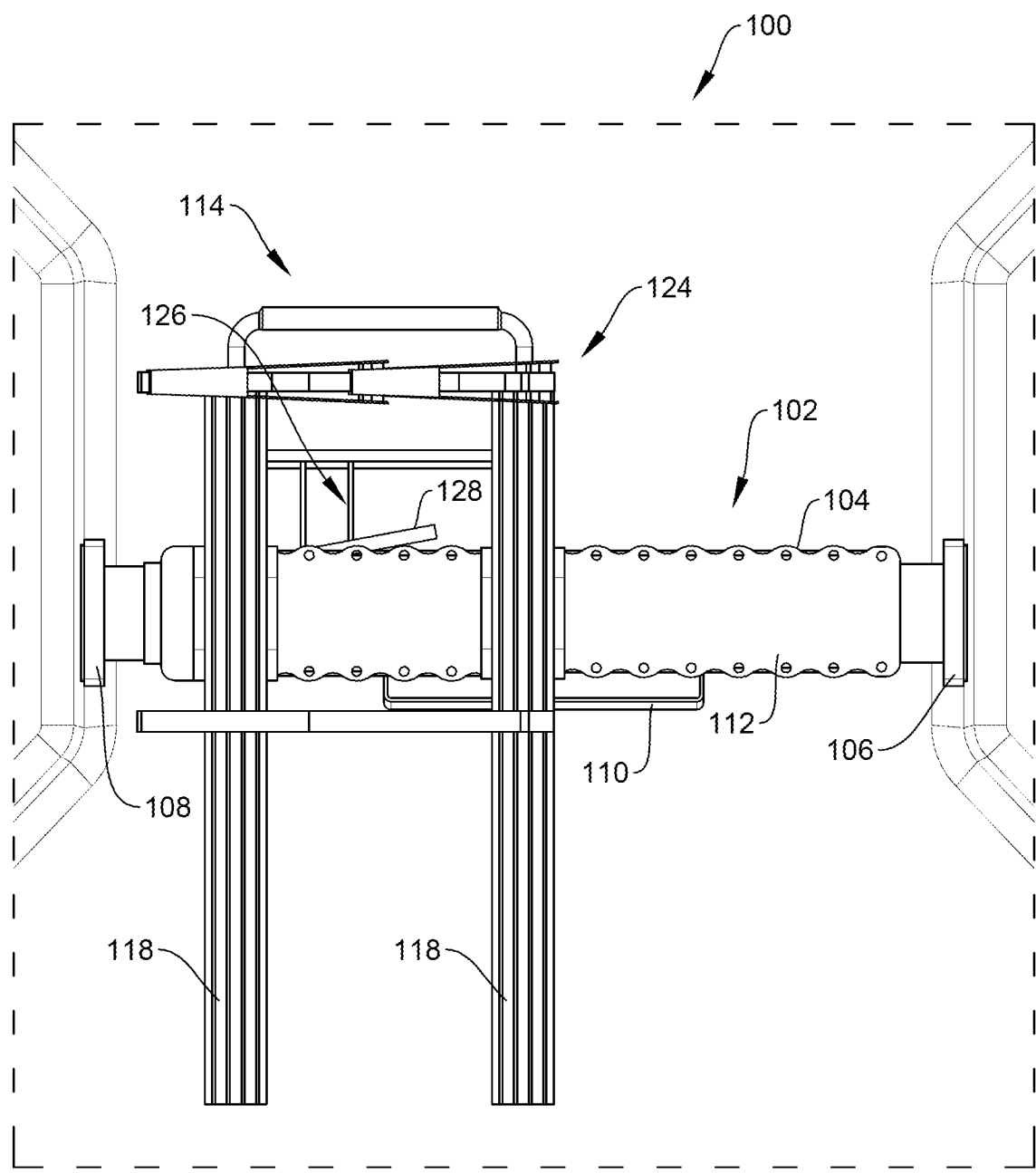
FIG. 2 shows an overhead plan view of a cargo storage system in an operating environment in accordance with an exemplary embodiment of the present disclosure.
Figure 3:
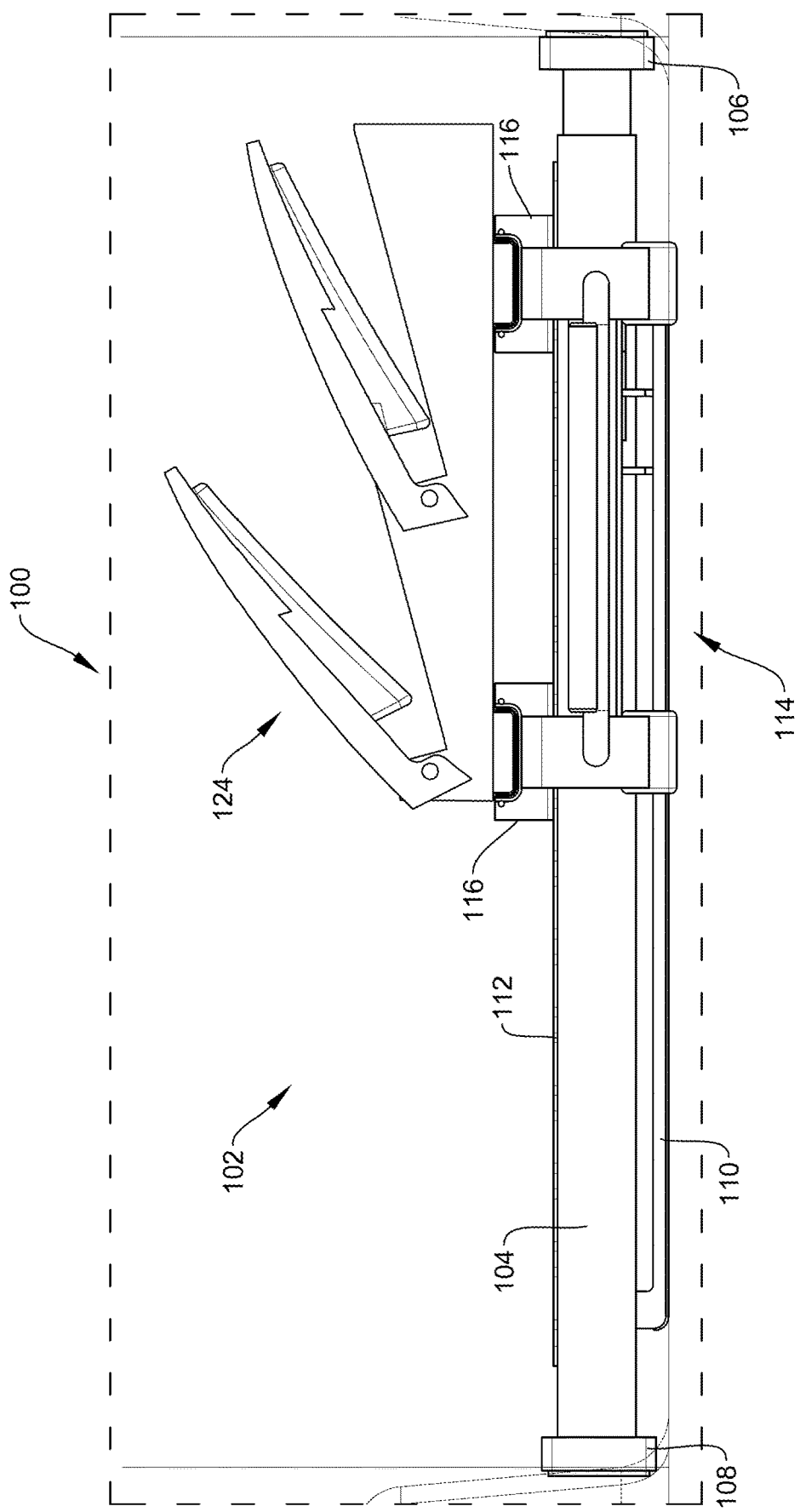
FIG. 3 shows a front view of the cargo storage system in an operating environment in accordance with an exemplary embodiment of the present disclosure.
Figure 4:
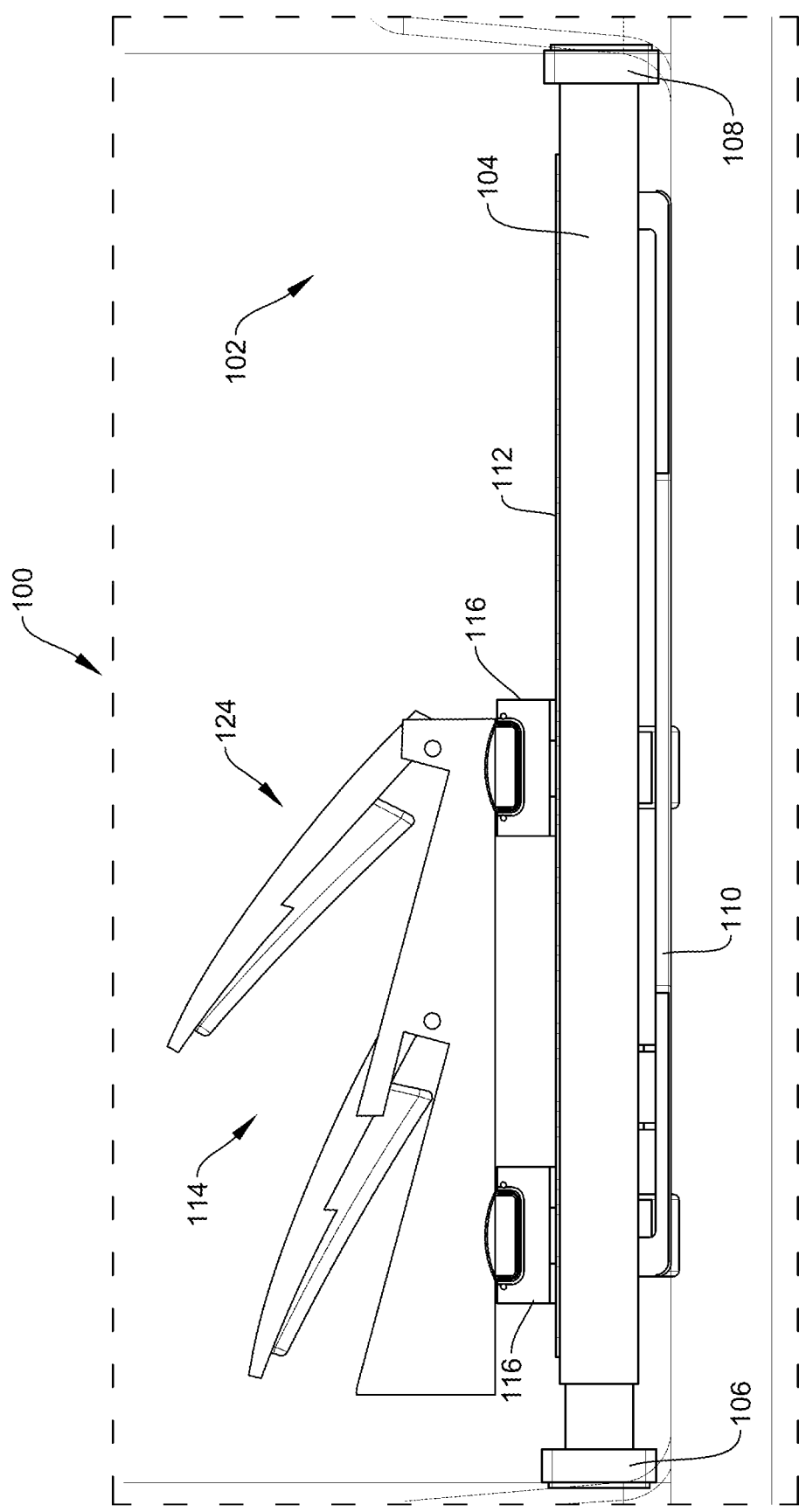
FIG. 4 shows a rear view of a cargo storage system in an operating environment in accordance with an exemplary embodiment of the present disclosure.

In aspects, the carrier module 114 may be configured to securely store and/or carry ski and/or snowboard equipment. For example, as shown in FIG. 1, the carrier module 114 securely retains a snowboard. As best shown in FIGS. 3 and 4, the at least one carrier module 114 may include two guide posts 116, each guide post defining a channel for receiving one or more guiding rails 118. In aspects, the one or more guiding rails 118 can be configured to allow the carrier module 114 to slide back and forth in the channel, along a predetermined travel path associated with orientation of the channel and the guiding rails 118. For example, as shown in FIG. 2, the orientation of the travel path for the guiding rails 118 is substantially orthogonal to the orientation of the spanner assembly 104, allowing for the carrier module 114 to travel along the travel path to allow users easier access to the carrier assembly. The guiding rails 118 may be formed using, for example, telescoping U-shaped channels, or the like and may include a sheath or cover on at least a portion of the guiding rails. In some aspects, the "sheath" protectors can help to mitigate snow and ice accumulating in the raceways of the guiding rails 118. In some embodiments, the guiding rails 118 may include one or more drainage holes.

Figure 5:
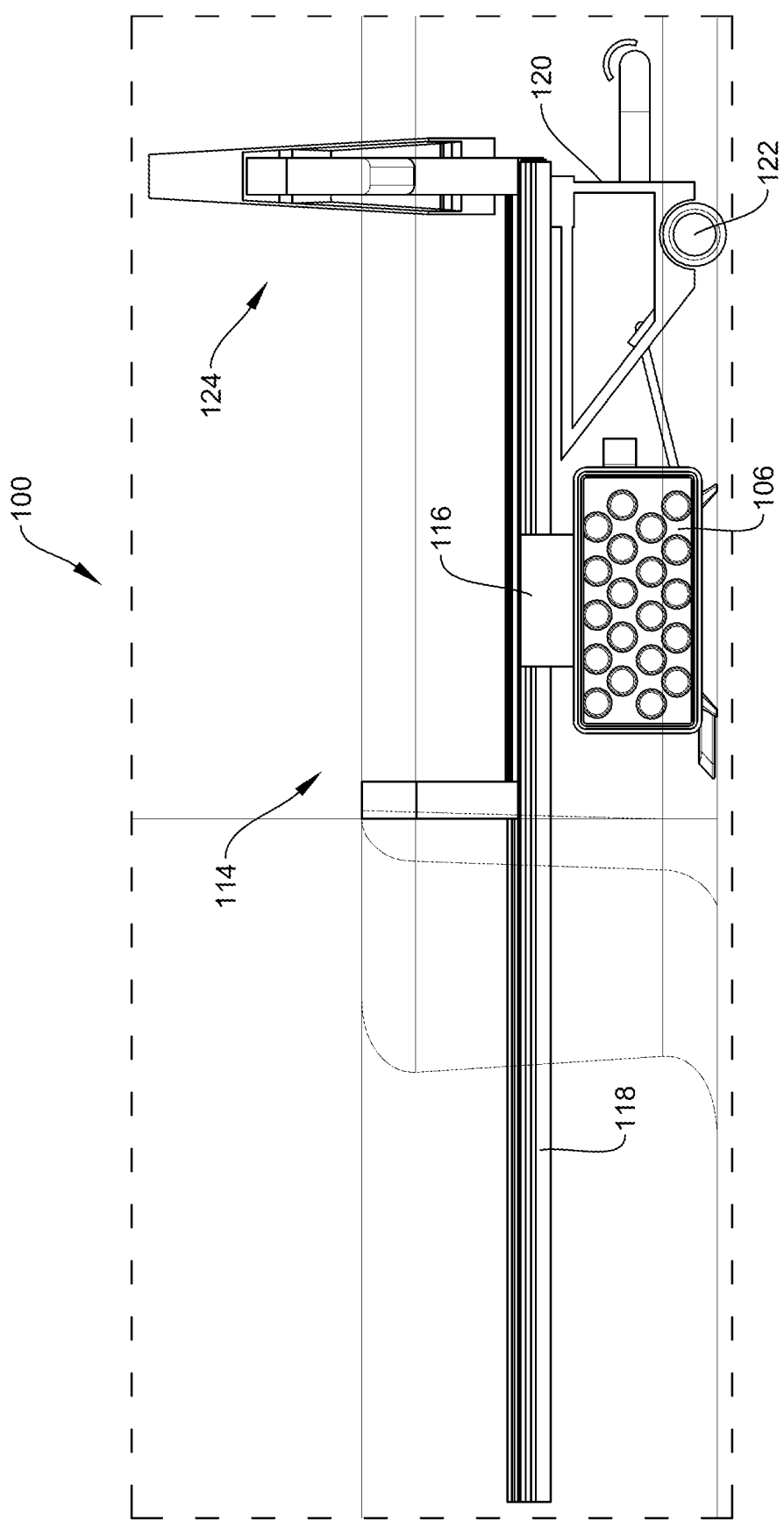
FIG. 5 shows a left side view of a cargo storage system in an operating environment in accordance with an exemplary embodiment of the present disclosure.
Figure 6:
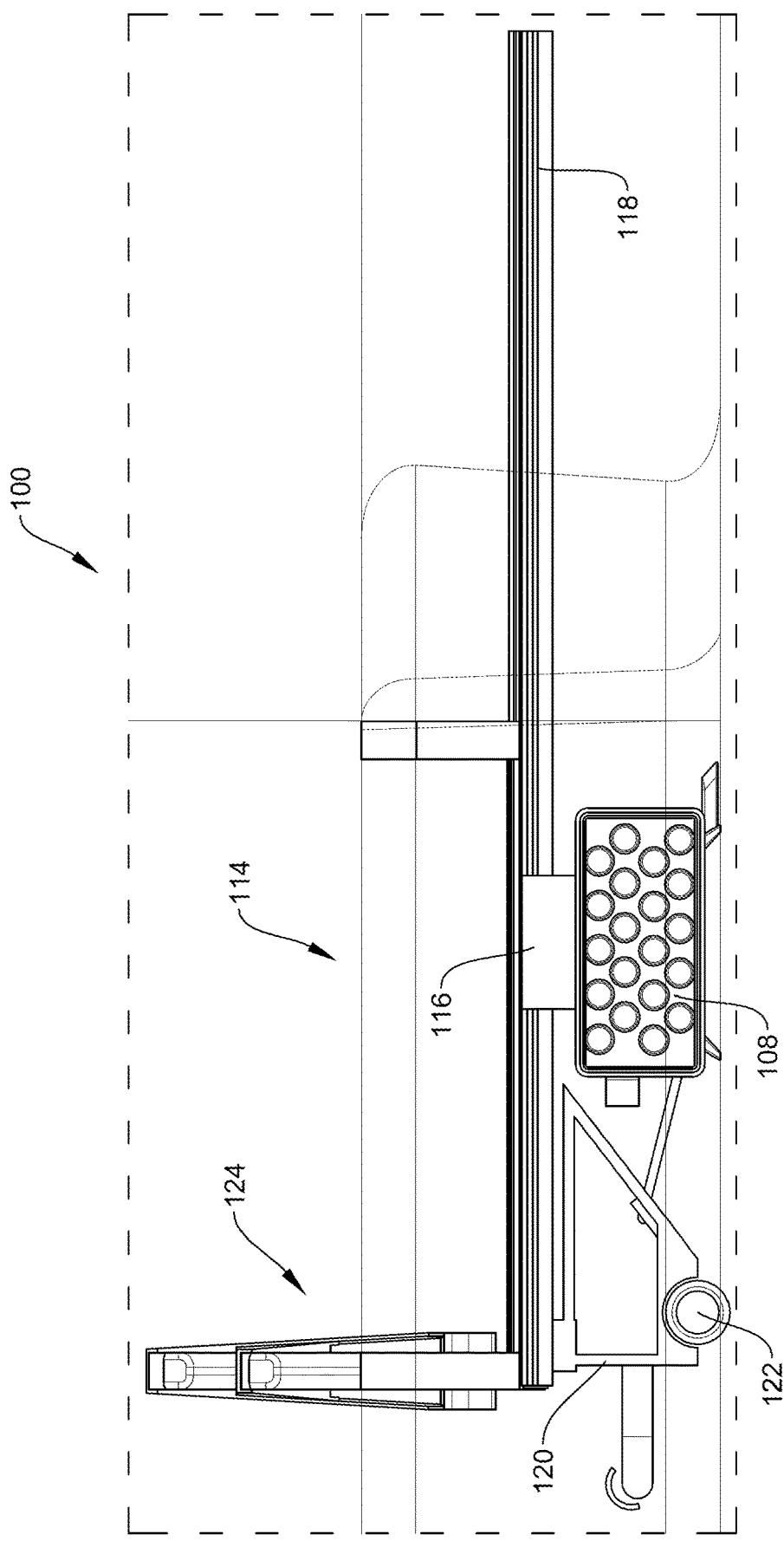
FIG. 6 shows a right-side view of a cargo storage system in an operating environment in accordance with an exemplary embodiment of the present disclosure.
Figure 7A:
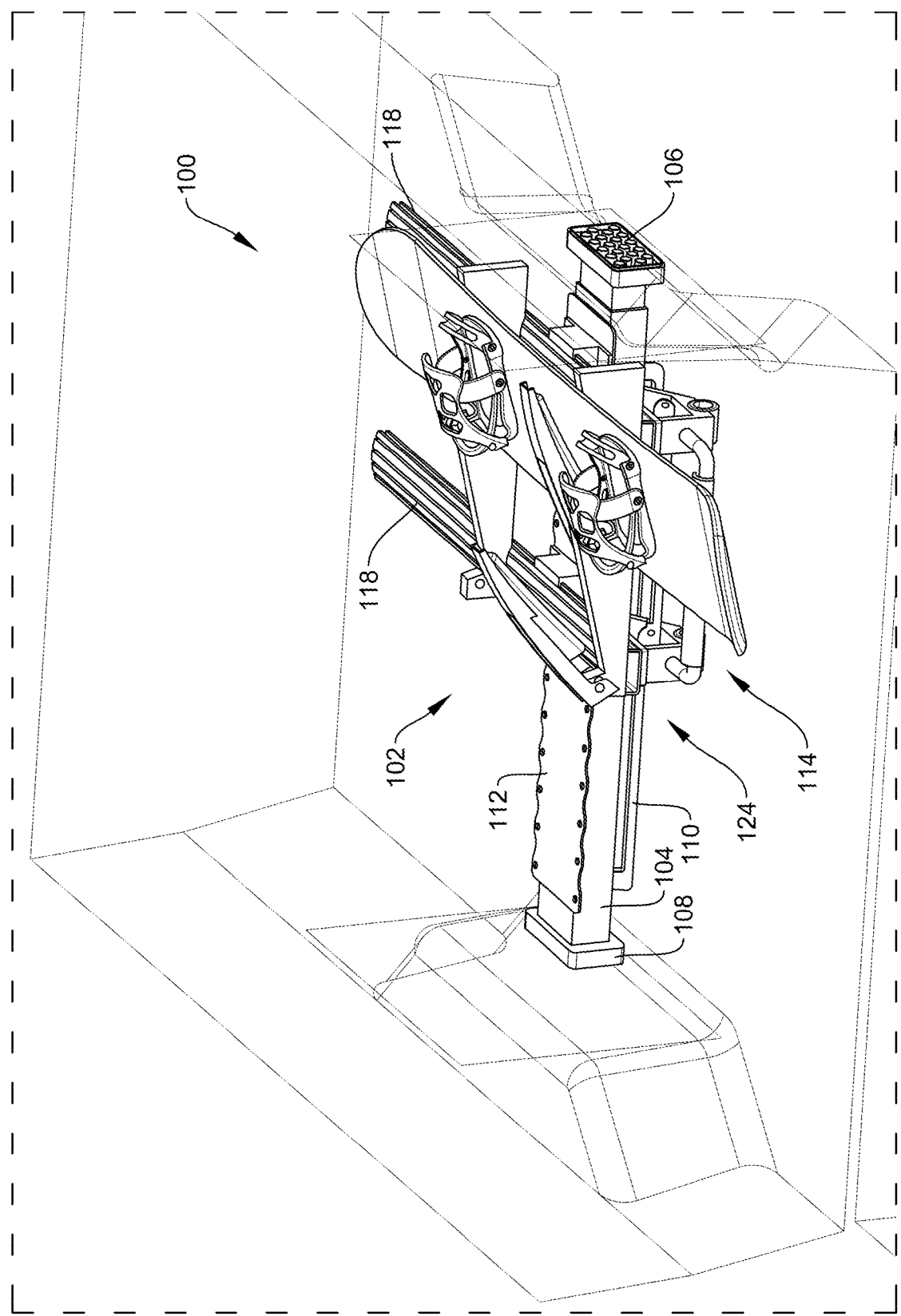
FIGS. 7A-7B show a depiction of a cargo storage system in an operating environment in accordance with an exemplary embodiment of the present disclosure.
Figure 7B:
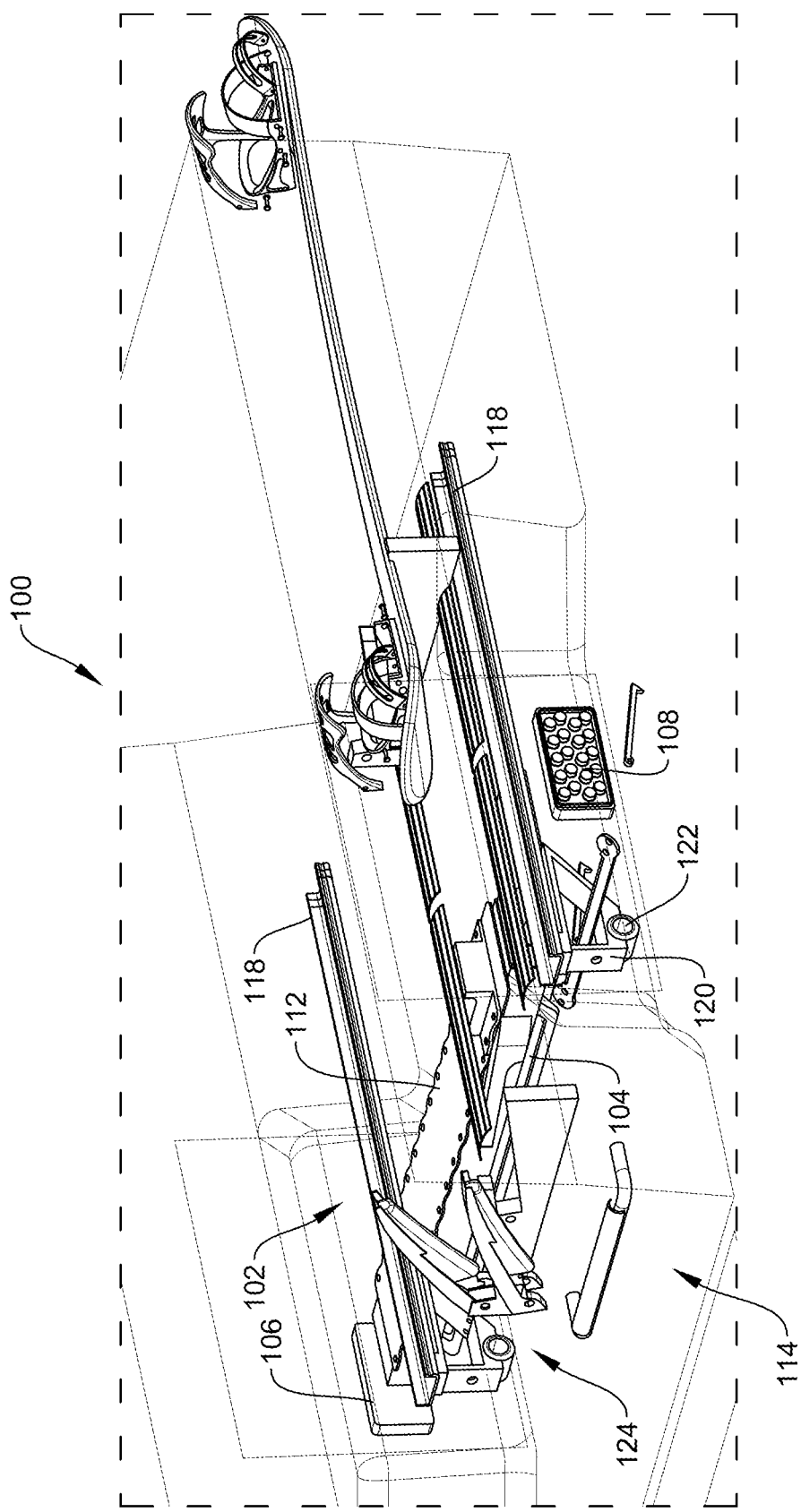

In some aspects, as best shown in FIGS. 5 and 6, the carrier module 114 includes one or more carrier supports 120. For example, the carrier module 114 as shown in FIG. 3 includes two carrier supports 120. Those of skill in the art will recognize that more or fewer carrier supports may be used, in some aspects, each carrier support 120 may include a floor roller 122 or other structure for contacting the floor of the truck bed and facilitating movement of the carrier module across the floor. In some aspects, one or more (e.g., each) carrier support 120 can be connected to one guiding rail 118. The carrier support 120 can be configured to move back and forth along the predetermined travel path. In some aspects, the carrier assembly 114 can include a rack apparatus 124 configured to hold equipment, such as skis and/or snowboards.

In some aspects, the system 100 may include a cargo holding apparatus. The cargo holding apparatus may be interchangeable. This inventive design allows a modular-friendly method of incorporating not only the rack configuration (as shown in FIGS. 1-7B), but other forms of racks and cargo containers to the spanner assembly. In some aspects, the spanner assembly 102 may include a mounting plate that can accommodate any number of guide posts, and any guide post spacing, allowing the system to carry numerous types of cargo and equipment, including more and/or different carrier assembly modules and/or cargo holding apparatuses. In an example embodiment, the mounting plate may be extended to cover the main and extendable portion of the spanner member and may include bolt spacing of 60 mm or less for compatibility and wider distances.

In some aspects, the spanner assembly 102 incorporates one or more securing mechanisms 126 that keep spanner member 104 in place during use, while also allowing convenient removal as needed. In the example shown in FIG. 2, the securing mechanism 126 may include a ratcheting mechanism contained within the spanner member with an external handle 128 to secure the extendable spanner member against sidewalls in the cargo area. In particular, actuation of the securing mechanism 126 (e.g., by actuation of the handle 128) can cause the first end 106 of the spanner member 104 to be urged towards the first side wall, and the second end 108 of the spanner member to be urged in an opposing direction, toward the second side wall. The first end 106 and the second end 108 can each include a high-friction surface such as a rubber or silicone pad configured to retain the system 100 within the bed of the truck using a friction fit. In some aspects, the spanner assembly 102 may also incorporate a handle 130 for easy carrying and installation by a user, for example, integrated into the spanner support or base 110.

As shown in FIGS. 8A-8B, the spanner assembly 102 and spanner securing mechanism 226 can include an indicator 202 (e.g., a visual indicator) on the spanner foot 200 configured to tell the user when there is a secure amount of pressure on the walls of the truck bed. As a particular example of indicator 202, the spanner 104 may include a path. In foot 200 at each of the first end 106 and the second end 108. In some aspects, foot 200 may be formed from a dual-color (and optionally dual-durometer) flexible silicone/rubber polymer material. The color and/or geometry of the foot 200 can allow a user to visually determine a secure amount of pressure on the walls of the truck bed, as well and provide a visual method of feedback about any shifting or loosening that may have happened during transport.

Figure 9A:
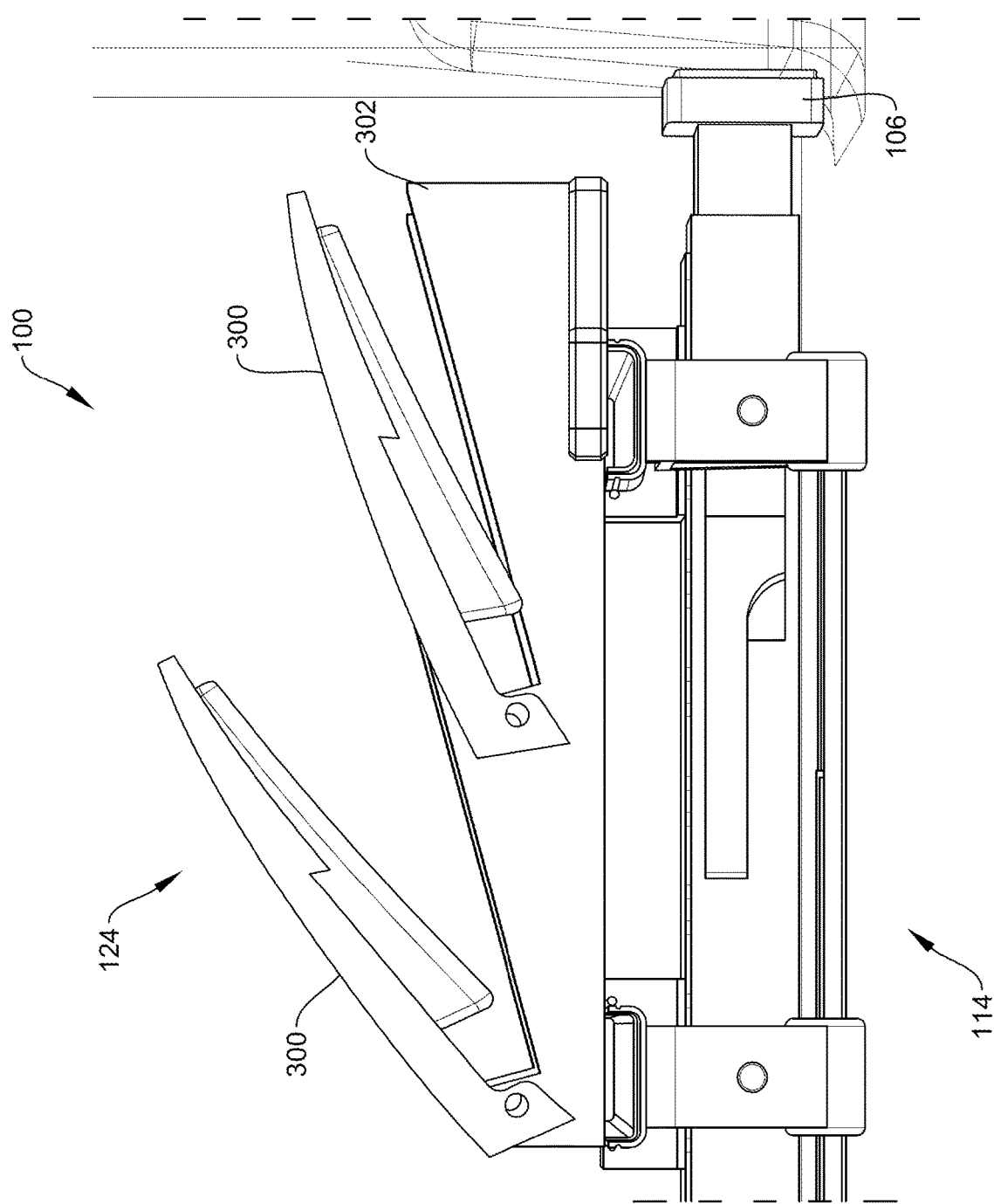
FIGS. 9A-9C show depictions of a cargo storage system in an operating environment in accordance with an exemplary embodiment of the present disclosure.
Figure 9B:
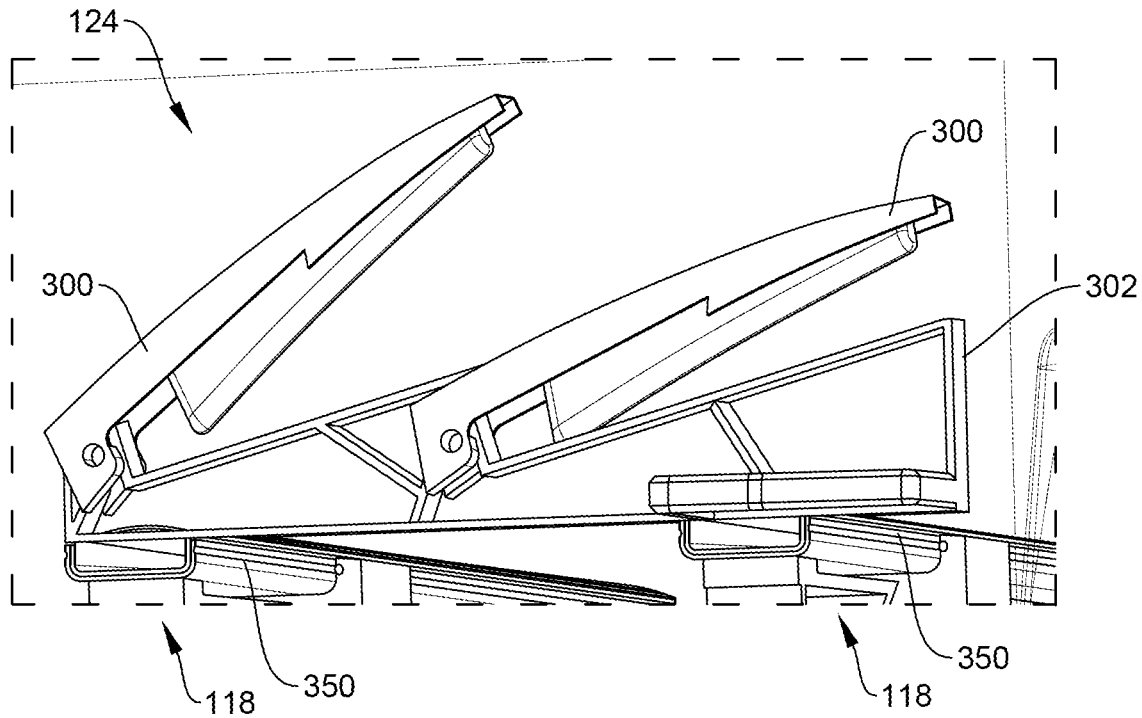
Figure 9C:
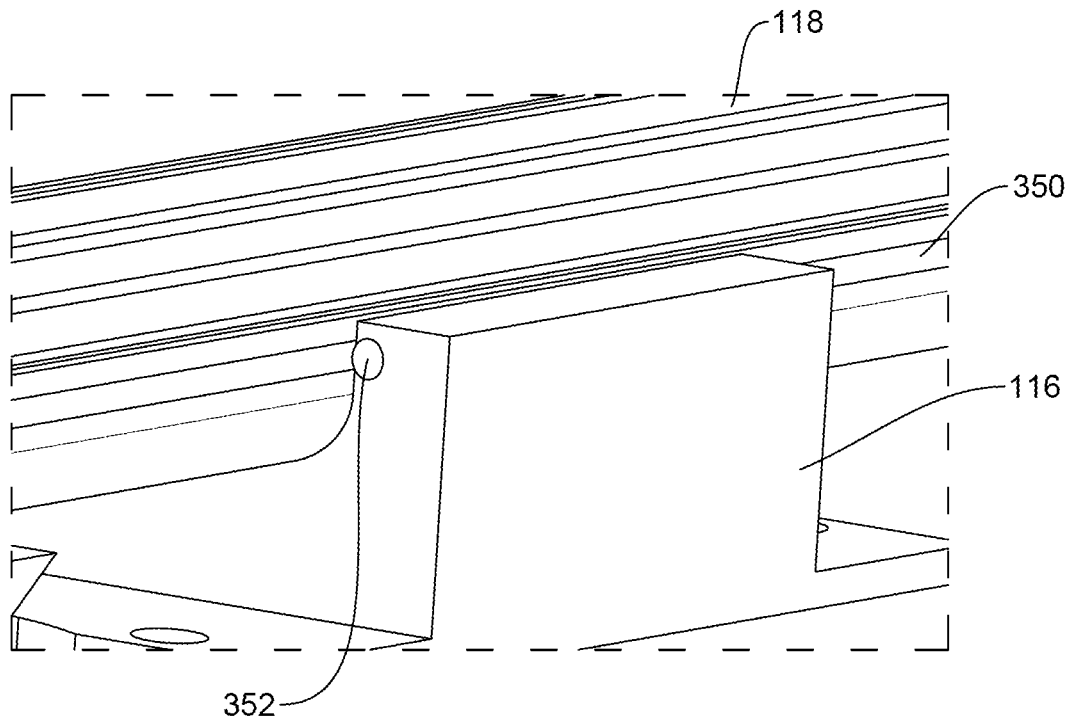

FIGS. 9A-9C show various views and components of a carrier module 114, the cargo holding apparatus being in the form of a rack for securing ski and/or snowboard equipment. As shown, the cargo holding apparatus 114 can include a securing mechanism 300 configured to simultaneously secure skis and/or snowboards. The securing mechanism 300 can optionally include a locking mechanism for locking the equipment in place to prevent theft when the equipment is unattended. In some embodiments, the securing mechanism 300 may be an overlapping jaw design. In some embodiments, the locking mechanisms may be integrated into the securing mechanism 300. Alternatively, the locking mechanism may be a separate component. For example, the locking mechanism can be a barrel lock or other lock for preventing removal of the snowboard and/or skis. In some aspects, the cargo holding apparatus may include a rack 302, configured as a low angle rack which can allow a more efficient packing of the skis and/or snowboards in a stored state, while accommodating access to any of the stored equipment.

FIG. 9C shows an exemplary guiding mechanism employed in the guide post 116 and slidable guiding rails 118, including a groove 350 disposed along the outer guiding rail 118 and a pin or similar protrusion 352 disposed on the channel defined by the guide post 116. The slot or groove 250 receives the protrusion 352 within the groove 350 and directs movement of the guiding rails 118 in a fixed travel path.

Figure 10A:
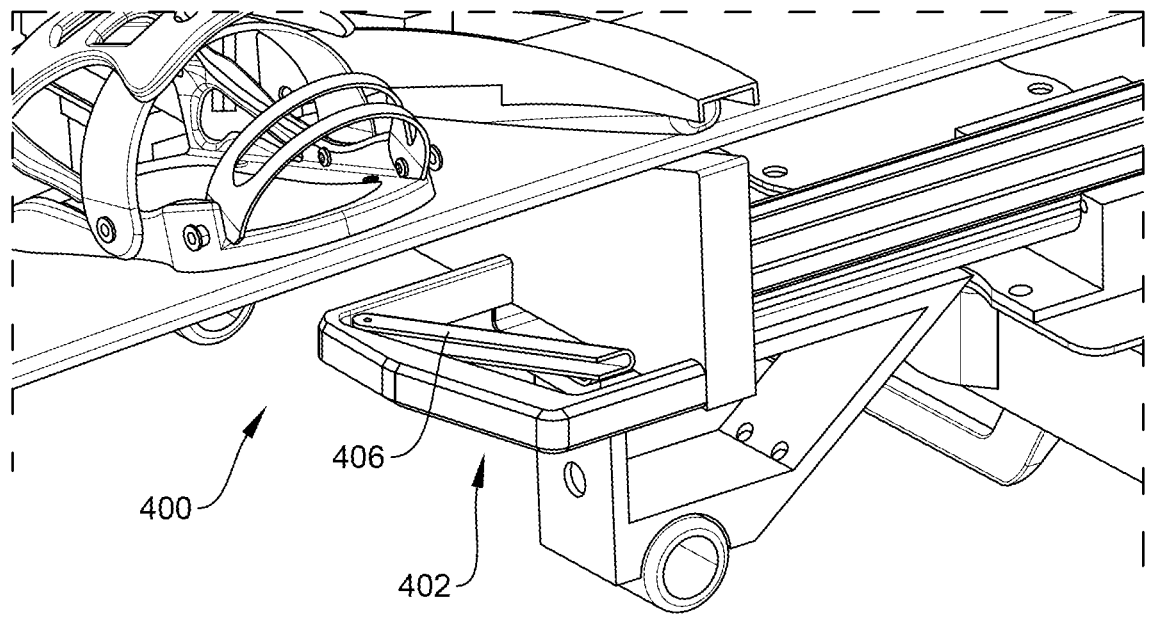
FIG. 10A-10D show depictions of a cargo storage system in an operating environment in accordance with an exemplary embodiment of the present disclosure.
Figure 10B:
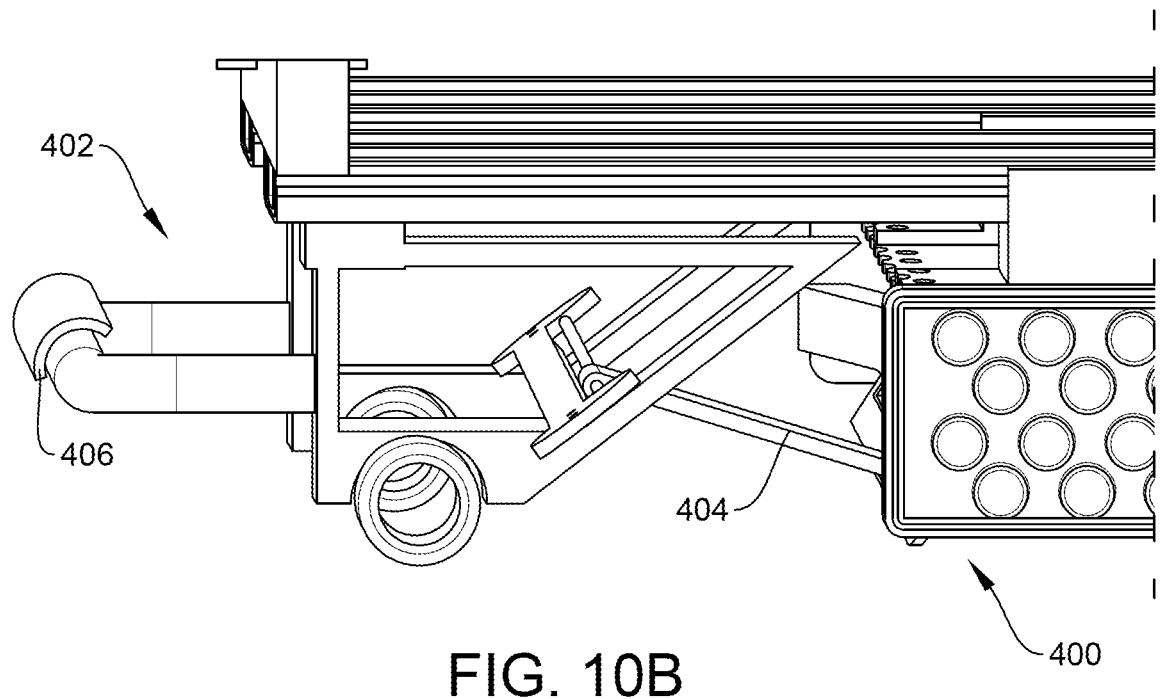
Figure 10C:
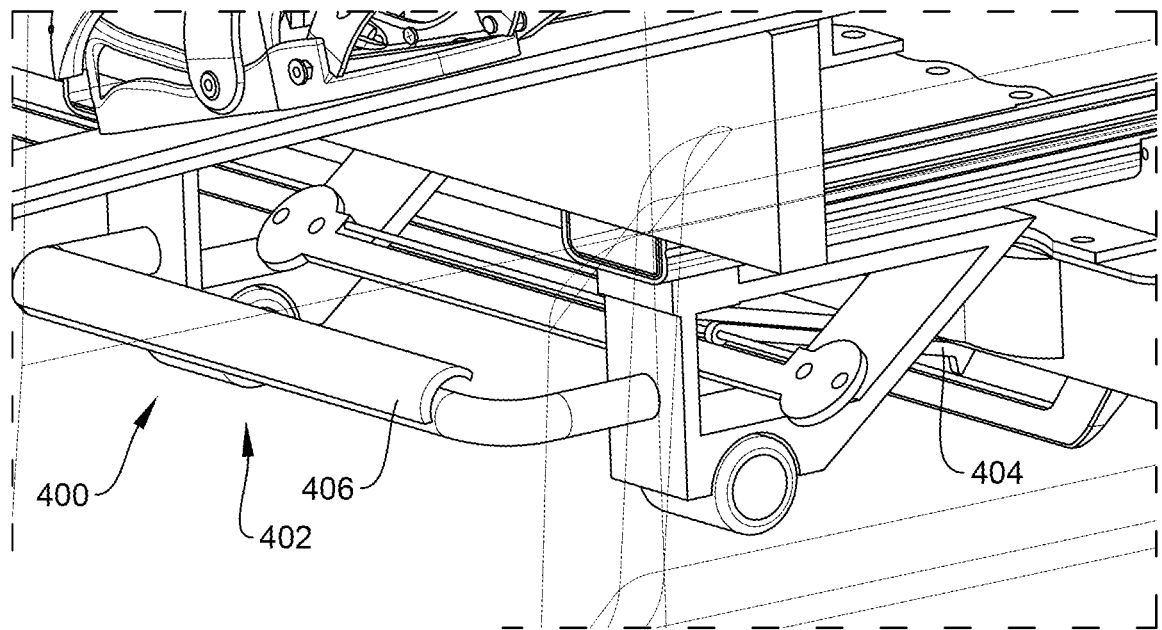
Figure 10D:
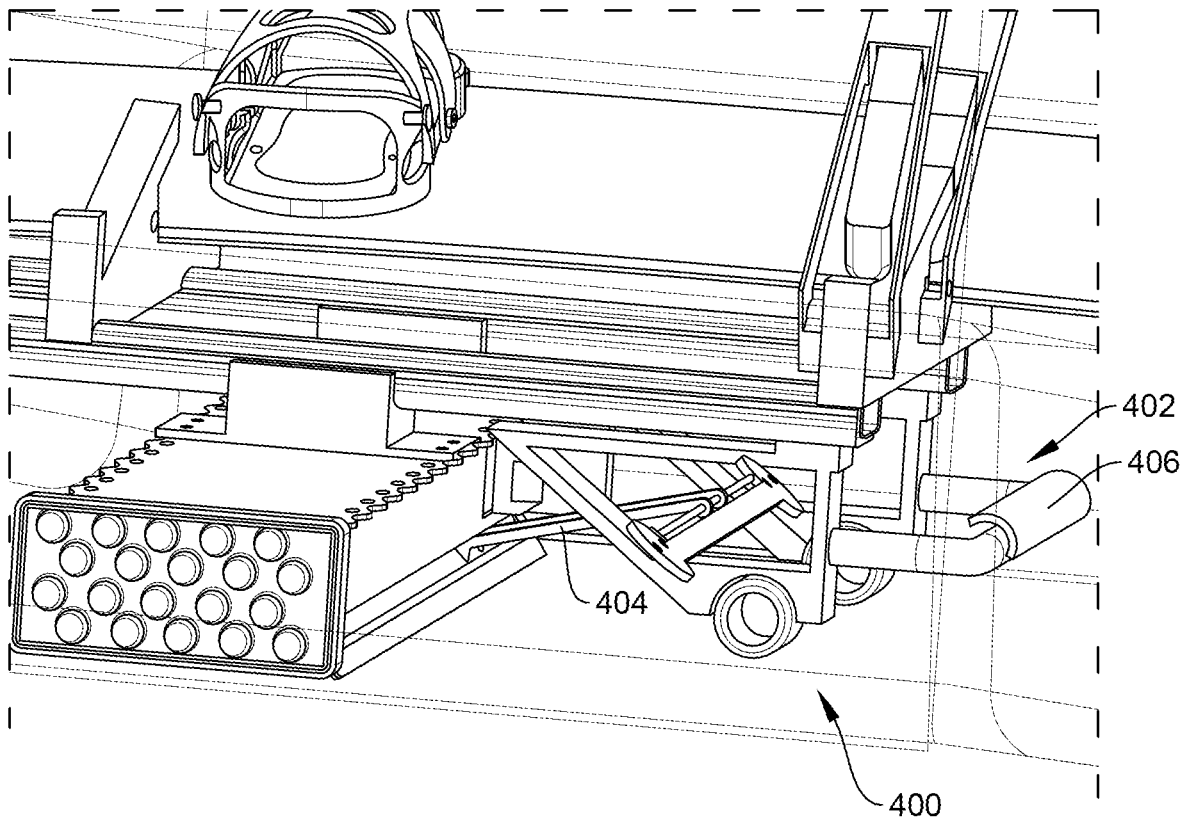

FIGS. 10A-10D show additional views and components of a carrier module 400. In particular, FIGS. 10A-10B show a carrier module 400 that includes the carrier support 120 with roller 122, as discussed above. In aspects, the carrier module 400 can include a braking mechanism 402 for securing some or all portions of the carrier module 400 to the spanner assembly (e.g., spanner assembly 102). As best shown in FIGS. 10C-10D, the braking mechanism 402 comprises a locking arm 404. A locked position may correspond to a position where the movable locking arm 404 is on or coupled with the spanner support in a manner effective to prevent the movable component of the carrier module 400 from being moved. An unlocked position may correspond to a position where the movable locking arm 404 is sufficiently decoupled from (e.g., retracted or rotated away from) the spanner assembly in a manner effective to allow travel of the movable portions of the carrier module 400. In some embodiments, the braking mechanism 402 may include an actuator 406 that causes the locking arm 404 to move between the locked position and the unlocked position. For example, the locking arm 404 may be in the locked position when the actuator 406 is not actuated, and may be in the unlocked position when a user actuates the actuator. The actuator 406 may be a handle, such as "lawnmower" style actuator or a "brake lever" style actuator in operable communication with a brake line or cable would pull said cable connected the movable locking arm 404 into the unlocked position.

Figure 11:
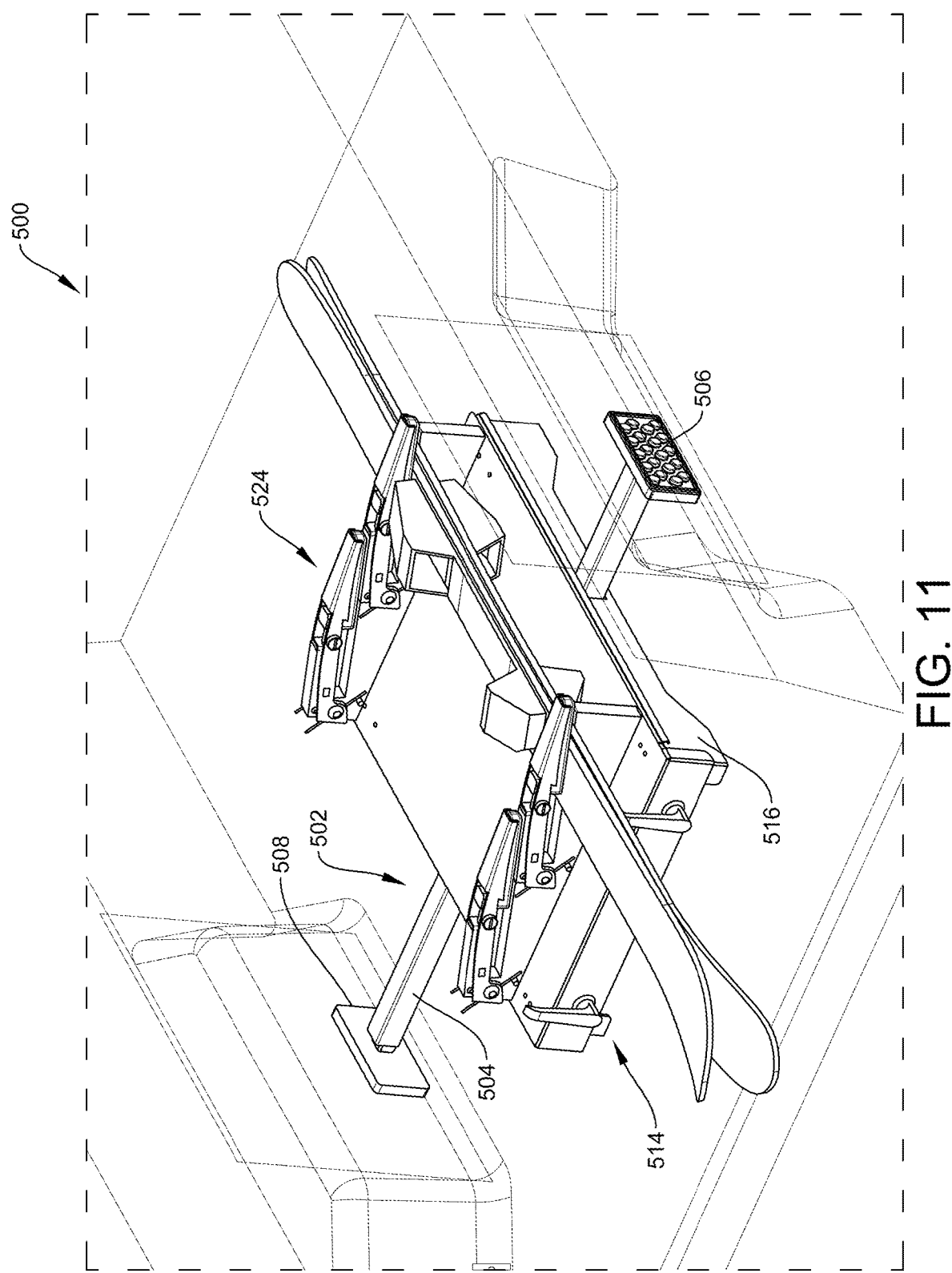
FIG. 11 shows a perspective view of a cargo storage system in an operating environment and storing equipment in accordance with a second exemplary embodiment of the present disclosure.

FIGS. 11-16 show a second exemplary embodiment of a cargo storage system 500 for providing cargo storage for a truck bed in accordance with the present invention. As shown in FIG. 11, the system 500 includes a spanner assembly 502 configured to be removably mounted to the cargo area. The spanner assembly 502 may include an extendible spanner member 504 having a first end 506 and a second end 508, the second end opposing the first end. In some aspects, the first end 506 may be configured to be releasably secured to a first sidewall of the cargo area and the second end 508 may be configured to be releasably secured to an opposed second sidewall of the cargo area.

In some aspects, one or more carrier modules 514 can be removably mounted on the extendible spanner member 504. For example, the carrier module 514 may be releasably coupled to the spanner assembly 502 by attachment to the extendible spanner member 504.

Figure 12:
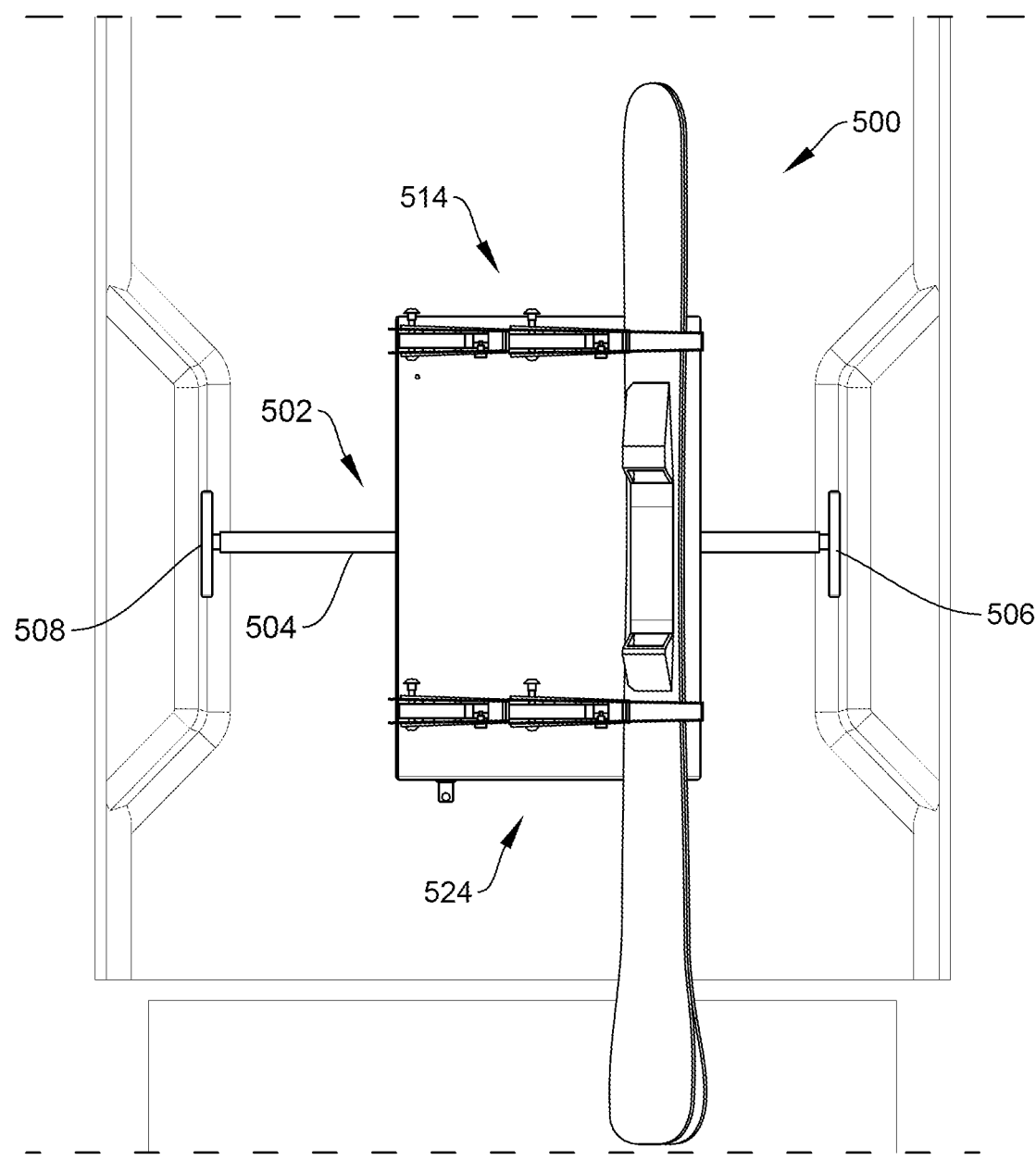
FIG. 12 shows an overhead plan view of a cargo storage system in an operating environment in accordance with the second exemplary embodiment of the present disclosure.
Figure 13:
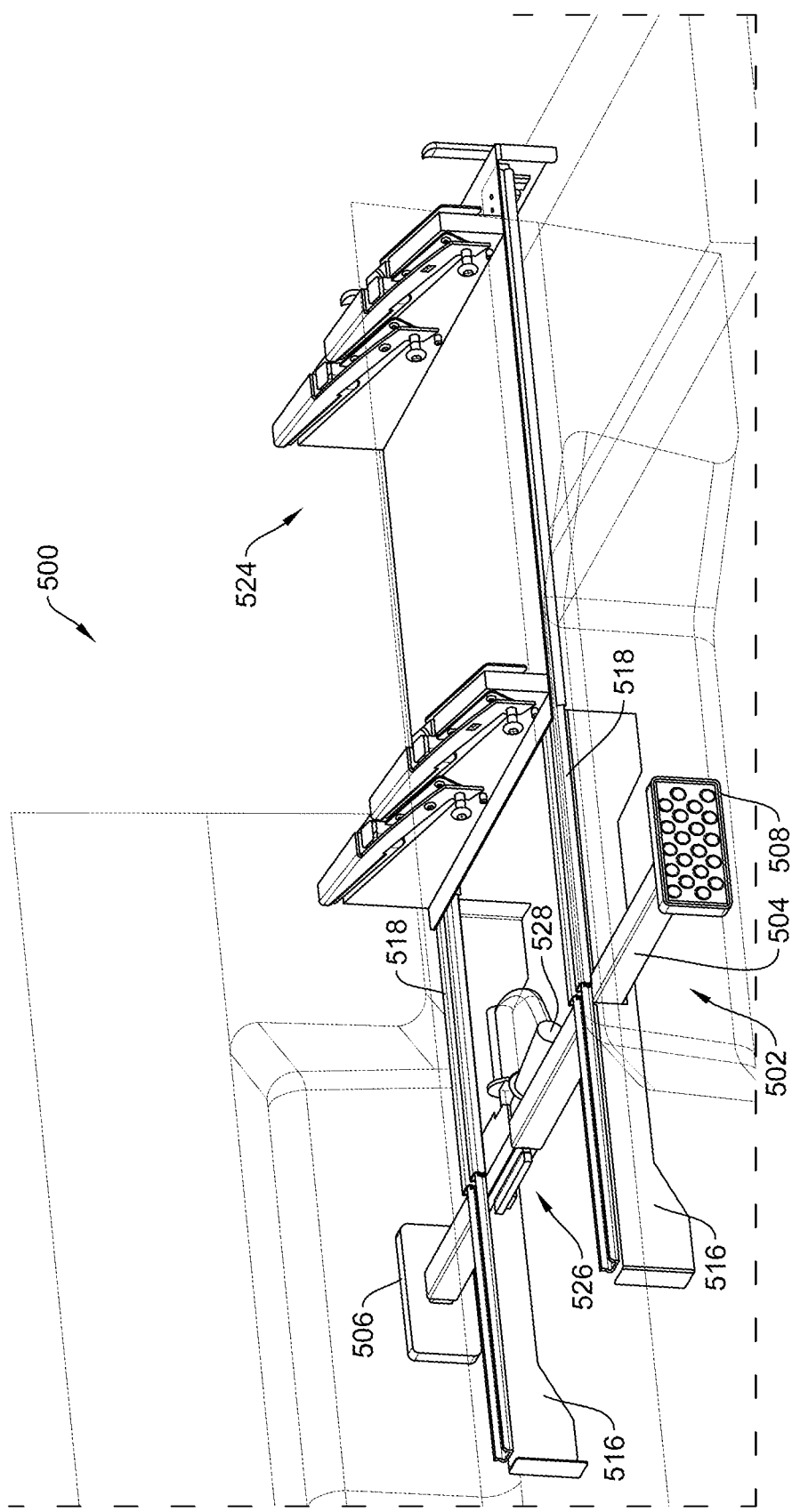
FIG. 13 shows a depiction of a cargo storage system in an operating environment in accordance with the second exemplary embodiment of the present disclosure.

In aspects, the carrier module 514 may be configured to securely store and/or carry ski and/or snowboard equipment. For example, as shown in FIG. 11, the carrier module 514 securely retains a pair of skis. As best shown in FIG. 13, the at least one carrier module 514 may include two guide posts 516, each guide post defining a channel for receiving one or more guiding rails 518. In aspects, the one or more guiding rails 518 can be configured to allow the carrier module 514 to slide back and forth in the channel, along a predetermined travel path associated with orientation of the channel and the guiding rails 518. For example, as shown in FIG. 12, the orientation of the travel path for the guiding rails 518 is substantially orthogonal to the orientation of the spanner assembly 504, allowing for the carrier module 514 to travel along the travel path to allow users easier access to the carrier assembly. The guiding rails 518 may be formed using, for example, telescoping U-shaped channels, or the like and may include a sheath or cover on at least a portion of the guiding rails. In some aspects, the "sheath" protectors can help to mitigate snow and ice accumulating in the raceways of the guiding rails 518. In some embodiments, the guiding rails 518 may include one or more drainage holes. As shown in FIG. 13, the system 500 is in an extended position, meaning that the telescoping guiding rails 518 are extended to provide the user with easier access to the carrier module 514.

In some aspects, the guiding rails 518 may be configured to support the weight of the carrier module 514 and any cargo retained by the carrier module, such that the carrier module does not contact the floor of the truck bed. In other embodiments, the carrier module 514 may include one or more carrier supports for contacting the floor of the truck bed and providing support for the carrier module. As a particular example, the carrier supports may be wheeled supports to facilitate movement of the carrier module 514 across the floor.

In some aspects, the carrier assembly 514 can include a rack apparatus 524 configured to hold equipment, such as skis and/or snowboards. In other embodiments, the carrier assembly may include different apparatuses configured to hold different equipment. The carrier assembly may be both versatile and customizable to the needs of the user. For example, in some aspects, the system 500 may include a cargo holding apparatus. The cargo holding apparatus may be interchangeable with the rack 524 as part of the carrier module 514. This inventive design allows a modular-friendly method of incorporating not only the rack configuration (as shown in FIGS. 11-16), but other forms of racks and cargo containers to the spanner assembly 502. In some aspects, the spanner assembly 502 may include a mounting plate that can accommodate any number of guide posts, and any guide post spacing, allowing the system to carry numerous types of cargo and equipment, including more and/or different carrier assembly modules and/or cargo holding apparatuses. In an example embodiment, the mounting plate may be extended to cover the main and extendable portion of the spanner member and may include bolt spacing of 60 mm or less for compatibility and wider distances.

In some aspects, the spanner assembly 502 incorporates one or more securing mechanisms 526 that keep spanner member 504 in place during use, while also allowing convenient removal as needed. In the example shown in FIG. 13, the securing mechanism 526 may include a rotating handle 128 that, when rotated, causes expansion of the extendible spanner member to secure the extendable spanner member against sidewalls in the cargo area. In particular, actuation of the securing mechanism 526 (e.g., by actuation of the handle 528, as shown by the arrow in FIG. 13) can cause the first end 506 of the spanner member 504 to be urged towards the first side wall, and the second end 508 of the spanner member to be urged in an opposing direction, toward the second side wall. The first end 506 and the second end 508 can each include a high-friction surface such as a rubber or silicone pad configured to retain the system 500 within the bed of the truck using a friction fit.

In some embodiments, each of the first end 506 and the second end 508 may include a foot for contacting the walls of the truck bed. In some aspects, the foot may be formed from a dual-color (and optionally dual-durometer) flexible silicone/rubber polymer material. The color and/or geometry of the foot can allow a user to visually determine that a secure amount of pressure is applied on the walls of the truck bed. The color and/or geometry of the foot may provide a visual method of feedback about any shifting or loosening that may have happened during transport.

Figure 14:
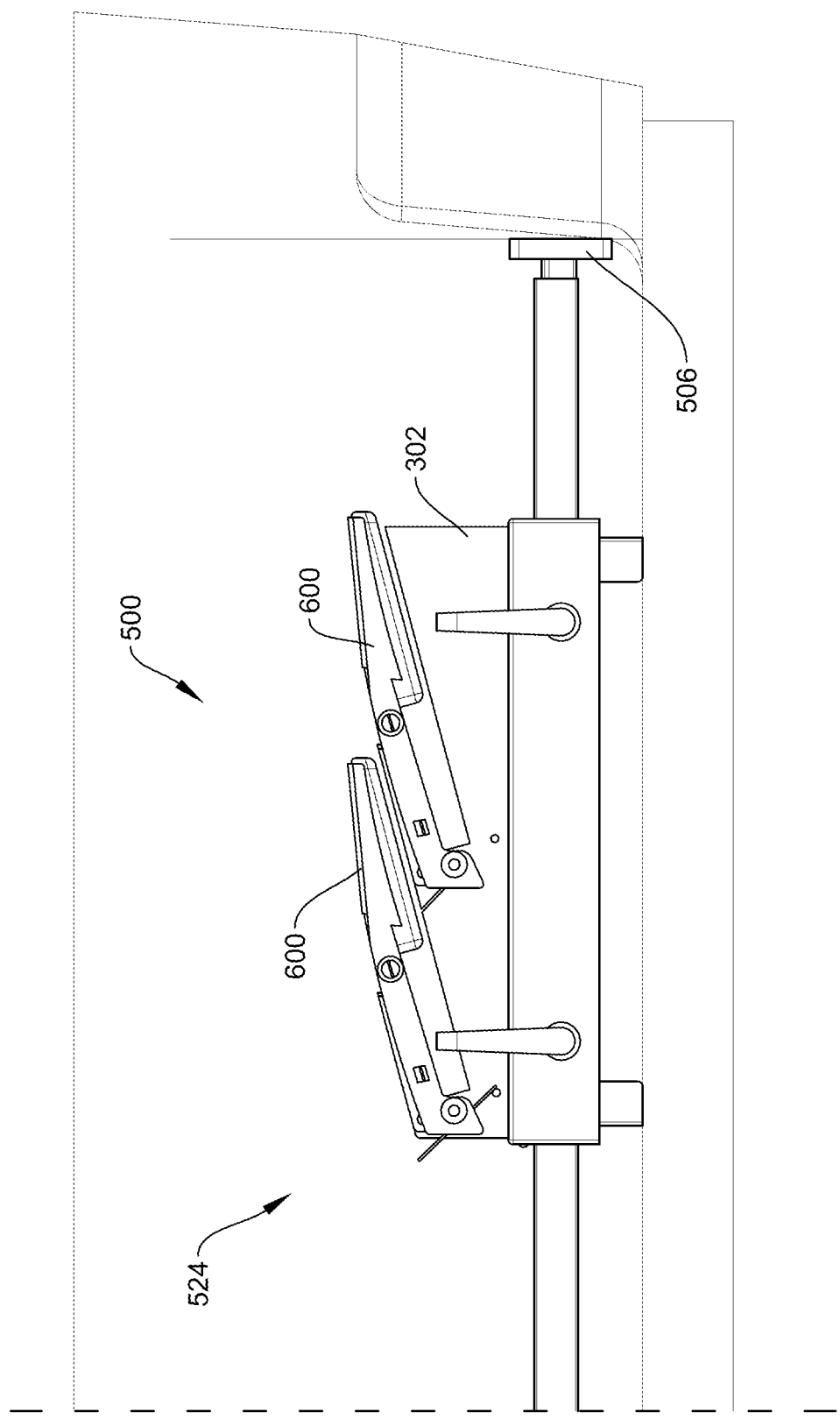
FIG. 14 shows a depiction of a cargo storage system in an operating environment in accordance with an exemplary embodiment of the present disclosure.

FIG. 14 shows a particular configuration of the carrier module 114, including a cargo holding apparatus being in the form of a rack 600 for securing ski and/or snowboard equipment. As shown, the cargo holding apparatus 114 can include a securing mechanism 600 configured to simultaneously secure skis and/or snowboards. The securing mechanism 600 can optionally include a locking mechanism for locking the equipment in place to prevent theft when the equipment is unattended. In some embodiments, the securing mechanism 600 may be an overlapping jaw design. In some embodiments, the locking mechanisms may be integrated into the securing mechanism 600. Alternatively, the locking mechanism may be a separate component. For example, the locking mechanism can be a barrel lock or other lock for preventing removal of the snowboard and/or skis. In some aspects, the cargo holding apparatus may include a rack 602, configured as a low angle rack which can allow a more efficient packing of the skis and/or snowboards in a stored state, while accommodating access to any of the stored equipment.

Figure 15:
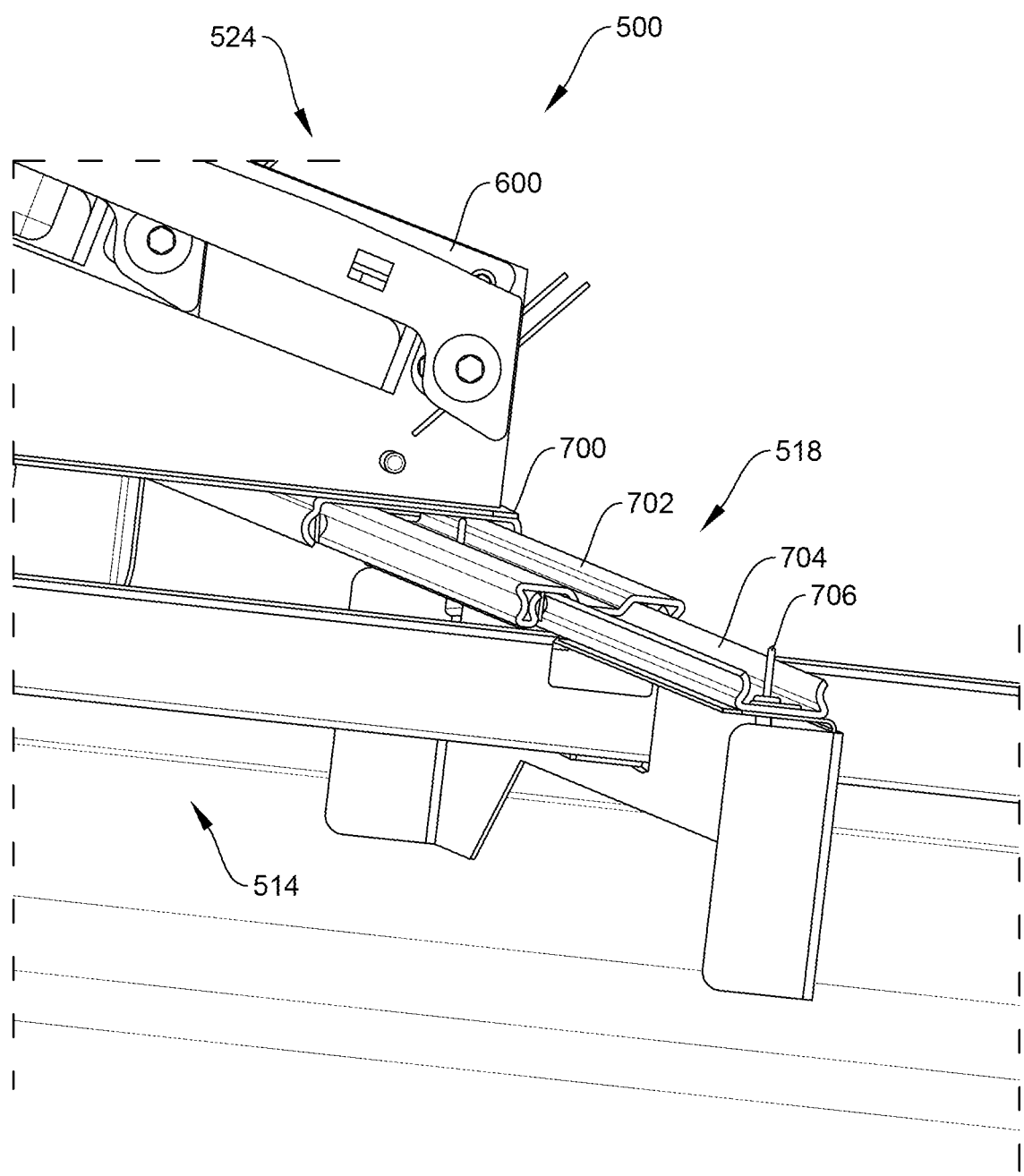
FIG. 15 shows a depiction of a cargo storage system in an operating environment in accordance with an exemplary embodiment of the present disclosure.

FIG. 15 shows an exemplary guiding mechanism employed in the guide post 516 and slidable guiding rails 518. In particular, as shown in FIG. 15, the guiding rails 518 include a fixed section 700, a first extending section 702, and a second extending section 704. While the telescoping guiding rail 518 is shown having three sections, those of skill in the art will recognize that more or fewer sections may be used. As shown, while in a compact nested configuration, the second moving section 704 nests inside the first moving section 702, which in turn nests inside the fixed section 700. The guiding rail 518 may further include a pin 706 disposed at a distal end of the guiding rail. The pin 706 may be sized such that, when a user moves the carrier module 514 from an extended position to a closed position (e.g., collapsing the telescoping guiding rail 518), the pin 706 may contact at least a distal end of the first extending section 704, urging the first extending section into the nested position within the fixed section 700.

Figure 16:
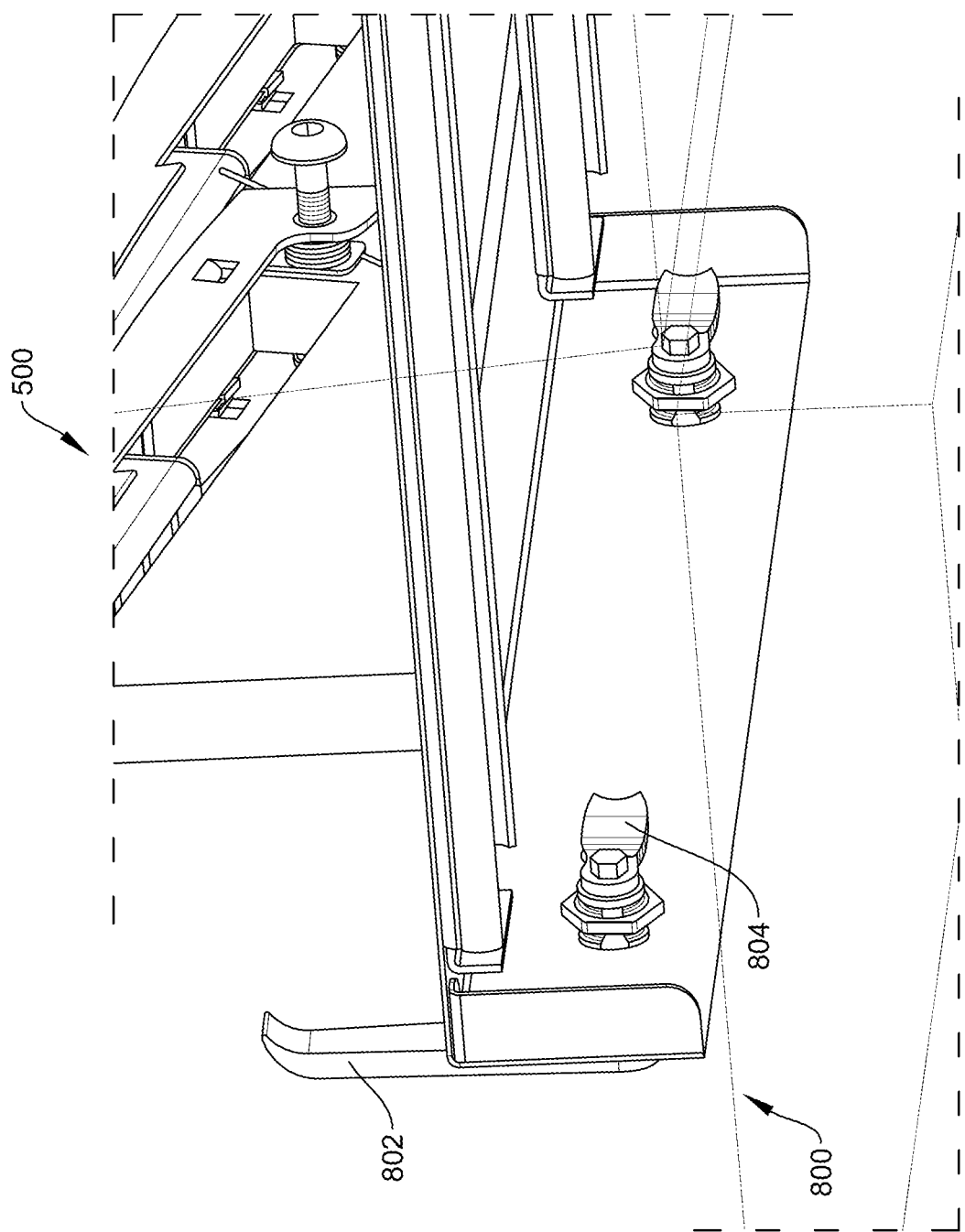
FIG. 16 shows a depiction of a cargo storage system in an operating environment in accordance with an exemplary embodiment of the present disclosure.

FIG. 16 show a locking mechanism 800 for the carrier module 514. In particular, FIG. 16 shows a carrier module 514 that includes rotating handle 802. In aspects, the handle 802 can be rotatably connected to a locking tab 804, such that rotation of the handle 802 about an axis also causes rotation of the locking tab about the same axis. The locking tab may be configured to lockingly engage with a portion of the system 500 (e.g., the spanner assembly 502) while the locking tab is disposed at a first orientation, such that the locking tab prevents movement of the carrier module 514 relative to the spanner assembly. While disposed in a second orientation, the locking tab 804 may not engage with the system 500, thus, allowing the carrier module to move along the axis defined by the guiding rails. Rotation of the rotating handle 802 by a user may cause the locking tab 804 to move between the first orientation and the second orientation.

D. System Operation and Methods for Use and Make

Also disclosed herein are methods of using a disclosed cargo storage rack, device, and system. For example, in another exemplary aspect, the present disclosure provides a method of providing cargo storage for a truck bed using a disclosed device and system. In further aspects, the truck bed may be a SUV cargo hold, a flatbed trailer, a straight body truck flatbed, or the like. In one aspect, the disclosed method can comprise one or more of the following steps: installing a spanner assembly in a truck bed; mounting a carrier or rack module to spanner assembly; deploying carrier module from retracted position to extended positions; securing equipment or cargo in cargo rack or cargo holding apparatus; and returning carrier module to retracted, locked module.

Figure 17:
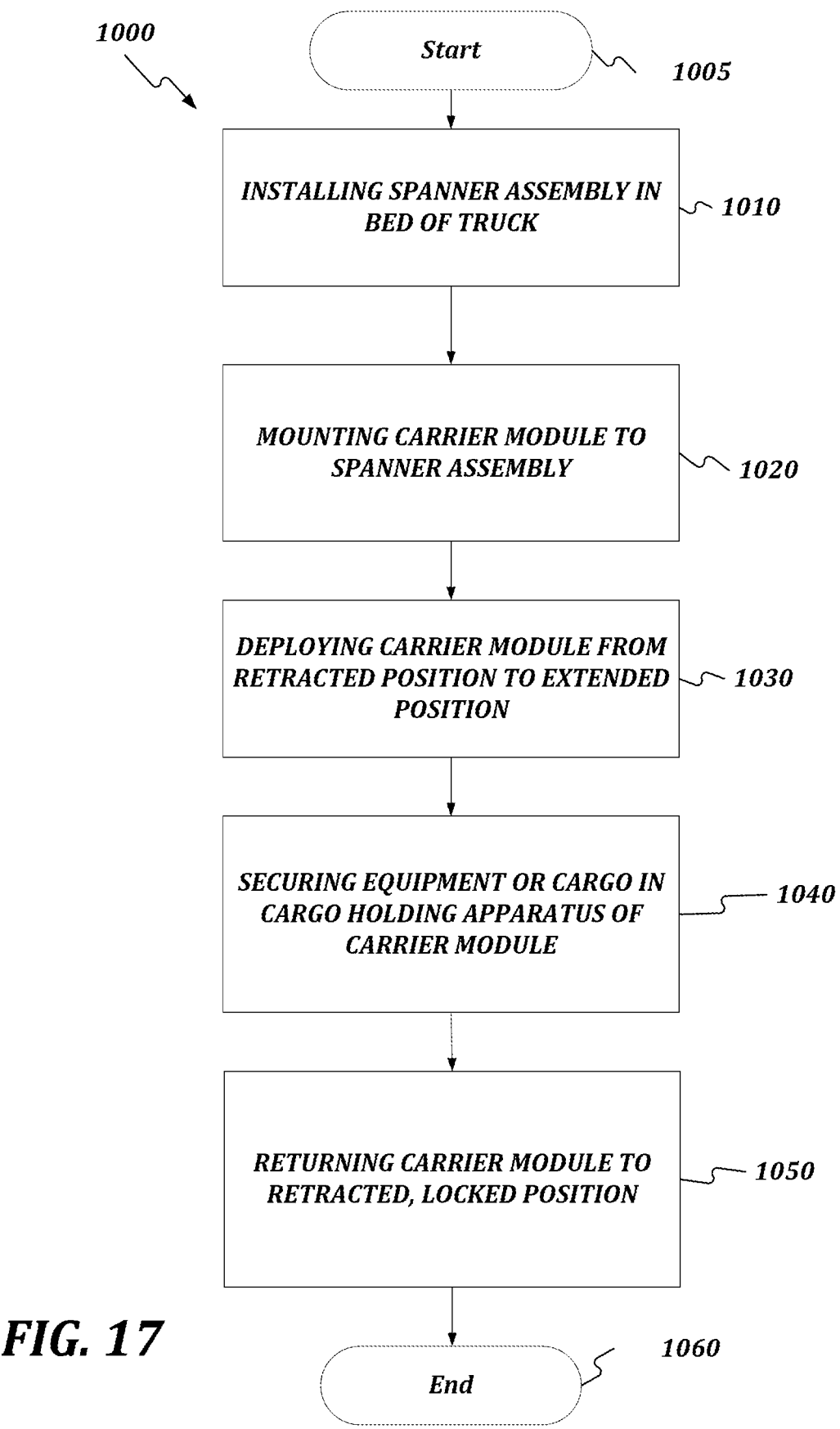
FIG. 17 is a flow chart of a method for providing cargo storage using a disclosed cargo storage system in accordance with an exemplary embodiment of the present disclosure.
Figure 18:
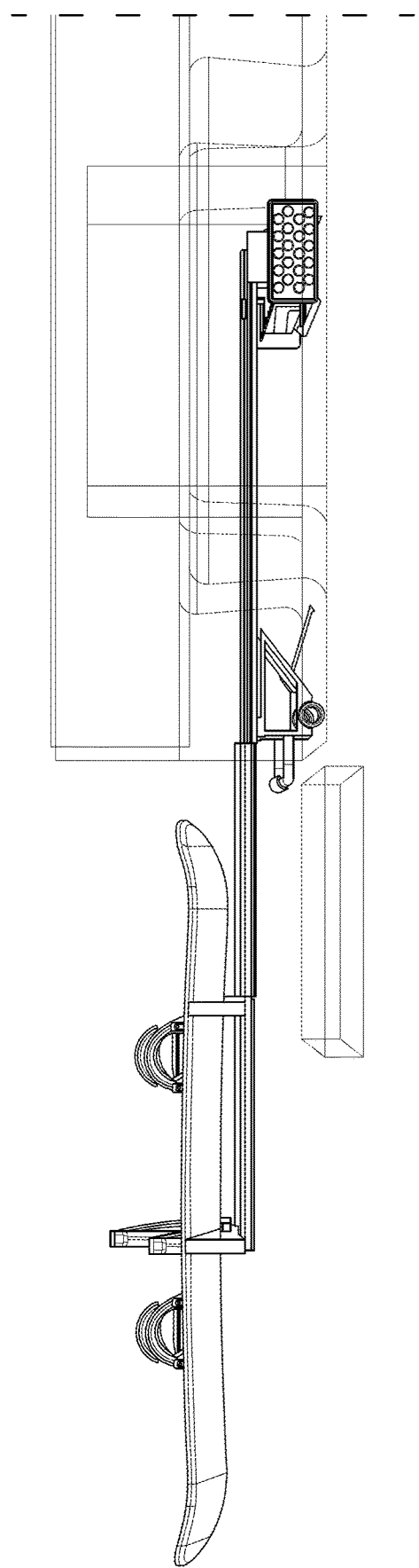
FIG. 18 shows a depiction of a cargo storage system in an operating environment in accordance with an exemplary embodiment of the present disclosure.
Figure 19:
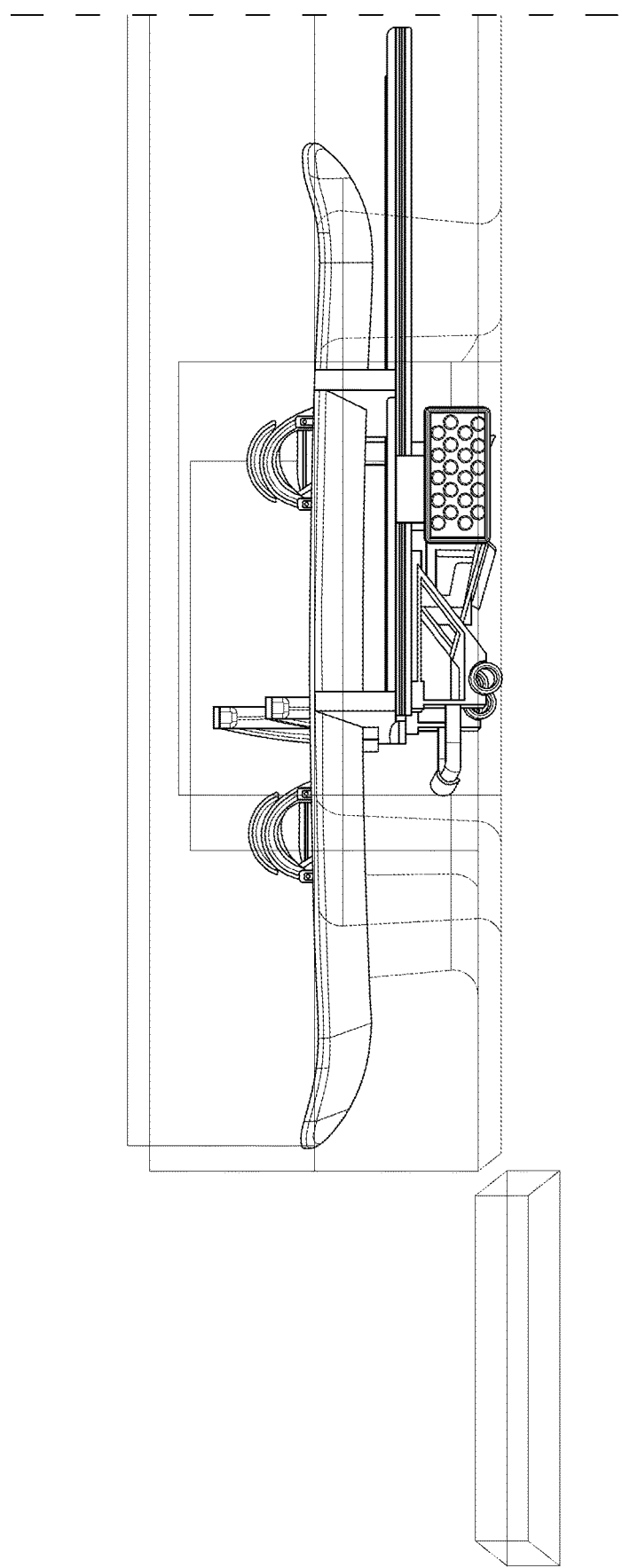
FIG. 19 shows a depiction of a cargo storage system in an operating environment in accordance with an exemplary embodiment of the present disclosure.

FIG. 17 is a flow chart and FIGS. 18-19 are pictures setting forth general stages involved in a method 1000 consistent with an embodiment of the disclosure for operating the disclosed cargo storage rack and systems. Method 1000 may be implemented using, at least in part, cargo storage system 100 as described in more detail with respect to FIGS. 1-16.

Although stages are disclosed with reference to the cargo storage system in FIGS. 1-16, it should be understood that other disclosed embodiments may enable the operation of method 1000, including, but not limited to, other mechanisms, mechanical components, environment properties, user conditions, and the like. Further still, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein.

Method 1000 may begin at starting block 1005 and proceed to stage 1010, where a spanner assembly is installed in a truck bed. For example, installing the spanner assembly may include positioning the spanner assembly within the truck bed, and actuating a securing mechanism of the spanner assembly to cause the first end and second end of the spanner assembly to move away from one another and towards opposing walls of the truck bed. The securing mechanism can cause the first end of the spanner assembly to contact the first wall, and the second end of the spanner assembly to contact the second wall. The securing mechanism can cause the spanner assembly to exert form on the first and second walls of the truck bed such that a foot of the first end and aa foot of the second end are deformed, causing a friction fit of the spanner assembly within the truck bed and securing the spanner assembly across the truck bed.

From stage 1010, where the spanner assembly is installed, the method 1000 may proceed to stage 1020, where one or more carrier modules may be mounted to the spanner assembly. The carrier modules may be mounted to the spanner assembly using, for example, bolts, screws, vice-style grips, or other removable securing means.

Following mounting of the carrier module to the spanner assembly in stage 1020, the method 1000 may proceed to stage 1030, where the carrier module is deployed from a retracted position to an extended position. In embodiments, deploying the carrier to the extended position may include actuating a braking mechanism of the carrier module and pulling on a handle to cause the carrier module to move to the extended position. The carrier module may slide forward on the carrier support and rollers, following a travel path defined by the guide rails and the channel of the guide posts.

From stage 1030, where the carrier module is deployed in the extended position, the method 100 may continue to stage 1040, where the user may secure equipment or cargo in a cargo holding apparatus of the carrier module. For securing skis and/or snowboards, the user may secure the items using an overlapping jaw style securing mechanism. For other cargo types, different securing mechanisms may be used. In embodiments, securing the equipment may comprise actuating a locking mechanism to prevent unauthorized removal of the equipment. An example depiction of the carrier module in the extended position and with cargo secured thereto is shown in FIG. 18.

From stage 1040, where the equipment is secured to the carrier module, the method 1000 may proceed to stage 1050, where the carrier module is returned to a retracted position. Returning the carrier module to the retracted position may include the user pushing the carrier module towards the spanner assembly. The carrier module may slide on the carrier support and rollers, following a travel path defined by the guide rails and the channel of the guide posts, towards the spanner assembly. The user may disengage the actuator (e.g., by releasing the handle) to allow the braking mechanism to relock, securing the carrier module in the retracted position. An example depiction of the carrier module in the retracted position and with cargo secured thereto is shown in FIG. 19. After stage 1050, method 1000 may end at stage 1060.

Also disclosed herein are kits comprising the disclosed modular cargo storage rack and system. For example, in an exemplary aspect, the present disclosure provides a cargo storage kit for truck beds comprising: a disclosed cargo storage device or system.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A cargo storage system for a vehicle cargo area, the system comprising:

a) a spanner assembly configured to be removably mounted to the cargo area, the spanner assembly comprising:
   an extendible spanner member having first and second opposed ends, said first end configured to be releasably secured to a first sidewall of the cargo area and said second end configured to be releasable secured to an opposed second sidewall of the cargo area;
   an assembly support connected to the spanner member and configured to be positioned on a floor of a cargo area; and
   at least one mounting plate connected to at least one portion of the spanner member, the at least one mounting plate configured for removably mounting one or more carrier modules; and
b) a carrier module configured to releasably couple to said spanner assembly and configured to securely store or carry cargo, the carrier module comprising:
   a plurality of guide posts, each guide post defining a corresponding channel;
   a plurality of guiding rails, each of said plurality of guiding rails configured to be received in a corresponding one of said channels defined by said plurality of guide posts, wherein each of said plurality of guiding rails are configured to cooperatively slide back and forth in said corresponding channel along a predetermined travel path associated with an orientation of said corresponding channel;
   at least one carrier support including a floor roller, each carrier support connected to at least one guiding rail and configured to move back and forth along said predetermined travel path; and
c) a cargo holding apparatus configured to detachably connect with the carrier module.

2. The cargo storage system of claim 1, wherein each of said first end and said second end comprise a foot form from a high friction material.

3. The cargo storage system of claim 1, wherein said spanner assembly comprises a securing mechanism configured to urge the first end and the second end in opposing directions.

4. The cargo storage system of claim 1, wherein said carrier module is configured to move between a retracted position and an extended position.

5. The cargo storage system of claim 1, wherein said carrier module further comprises a braking system configured to prevent movement of said carrier module.

6. The cargo storage system of claim 1, wherein said cargo holding apparatus is configured to releasably retain a snowboard.

7. The cargo storage system of claim 1, wherein said cargo holding apparatus further comprises a lock configured to secure said cargo within said cargo holding apparatus.

8. A cargo storage system for a vehicle cargo area, the system comprising:
a) a spanner assembly configured to be removably mounted to the cargo area, the spanner assembly comprising:
   an extendable spanner member having first and second opposed ends, said first end configured to be releasably secured to a first sidewall of the cargo area and said second end configured to be releasable secured to an opposed second sidewall of the cargo area;
   an assembly support connected to the spanner member and configured to be positioned on a floor of a cargo area; and
   at least one mounting plate connected to at least one portion of the spanner member, the at least one mounting plate configured for removably mounting one or more carrier modules; and
b) a carrier module releasably coupled to said spanner assembly and configured to securely store or carry cargo, the carrier module comprising:
   one or more guide posts, each guide post including a channel for receiving a guiding rail;
   a plurality of guiding rails, at least one guiding rail configured to cooperatively slide back and forth in said channel along a predetermined travel path associated with orientation of said channel;
   at least one carrier support including a carrier frame and floor roller, each carrier support connected to at least one guiding rail and configured to move back and forth along said predetermined travel path; and
   a cargo holding apparatus or rack.

9. The cargo storage system of claim 8, wherein each of said first end and said second end comprise a foot form from a high friction material.

10. The cargo storage system of claim 8, wherein said spanner assembly comprises a securing mechanism configured to urge the first end and the second end in opposing directions.

11. The cargo storage system of claim 8, wherein said cargo holding apparatus is configured to detachably connect to the carrier module.

12. The cargo storage system of claim 11, wherein said carrier module is configured to move between a retracted position and an extended position.

13. The cargo storage system of claim 11, wherein said carrier module further comprises a braking system configured to prevent movement of said carrier module.

14. The cargo storage system of claim 11, wherein said cargo holding apparatus is configured to releasably retain a snowboard.

15. The cargo storage system of claim 11, wherein said cargo holding apparatus further comprises a lock configured to secure cargo within said cargo holding apparatus.

16. A cargo storage system for a vehicle cargo area, the system comprising:
a) a spanner assembly configured to be removably mounted to the cargo area, the spanner assembly comprising:
   an extendible spanner member having first and second opposed ends, said first end configured to be releasably secured to a first sidewall of the cargo area and said second end configured to be releasable secured to an opposed second sidewall of the cargo area;
   an assembly support connected to the spanner member and configured to be positioned on a floor of a cargo area; and
   a mounting plate connected to at least one portion of the spanner member, the mounting plate configured for removably mounting one or more carrier modules; and
b) a plurality of guide posts configured to releasably connect to said mounting plate, each guide post including a channel for receiving a guiding rail;
c) a plurality of guiding rails, at least one guiding rail configured to cooperatively slide back and forth in a guide post channel along a predetermined travel path associated with orientation of said channel;
d) at least one carrier support including a floor roller, each carrier support connected to at least one guiding rail and configured to move back and forth along said predetermined travel path; and e) a cargo holding apparatus configured to detachably connect with one or more guiding rails.

17. The cargo storage system of claim 16, wherein said cargo holding apparatus is configured to detachably connect to the carrier module.

18. The cargo storage system of claim 17, The cargo storage system of claim 1, wherein said cargo holding apparatus is configured to releasably retain a snowboard.

19. The cargo storage system of claim 17, wherein said cargo holding apparatus further comprises a lock configured to secure cargo within said cargo holding apparatus.

20. The cargo storage system of claim 16, wherein said spanner assembly comprises a securing mechanism configured to urge the first end and the second end in opposing directions.

* * * * *